Figure 1:
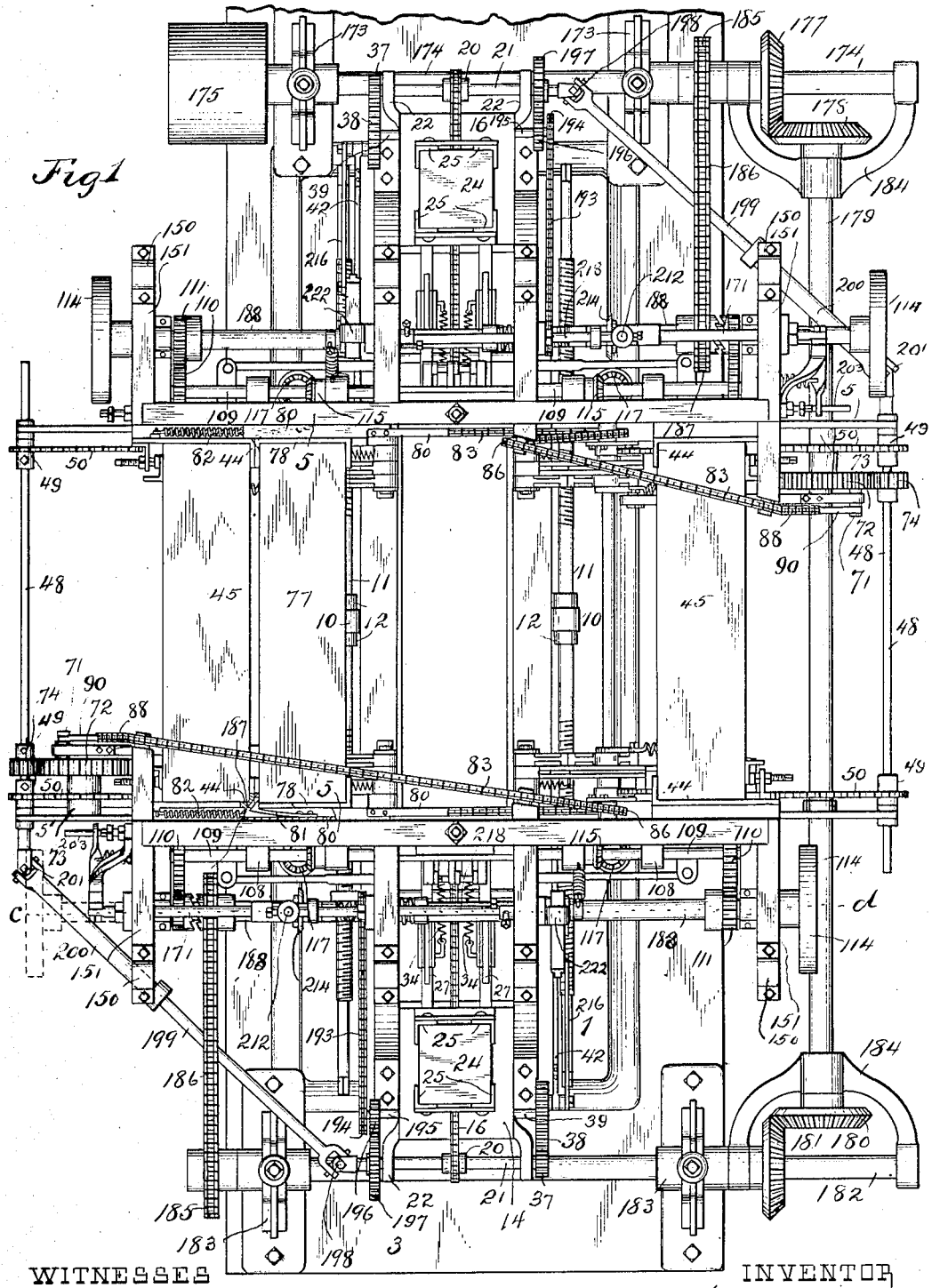

E. W. MYERS.
BOX MAKING MACHINE.
APPLICATION FILED AUG. 22, 1905.

913,837.

Patented Mar. 2, 1909.
14 SHEETS—SHEET 2.

WITNESSES:
R. E. Hamilton.
J. W. Ochs

INVENTOR
E. W. Myers
By Warren D. House,
His Attorney.

E. W. MYERS.
BOX MAKING MACHINE.
APPLICATION FILED AUG. 22, 1905.

913,837.

Patented Mar. 2, 1909.
14 SHEETS—SHEET 3.

WITNESSES
R E Hamilton
J. W. Ochs

INVENTOR
E. W. Myers,
By Warren D. House,
His Attorney.

E. W. MYERS.
BOX MAKING MACHINE.
APPLICATION FILED AUG. 22, 1905.

913,837.

Patented Mar. 2, 1909.
14 SHEETS—SHEET 5.

WITNESSES:
R. E. Hamilton.
J. W. Ochs.

INVENTOR
E. W. Myers,
By Warren D. House,
His Attorney.

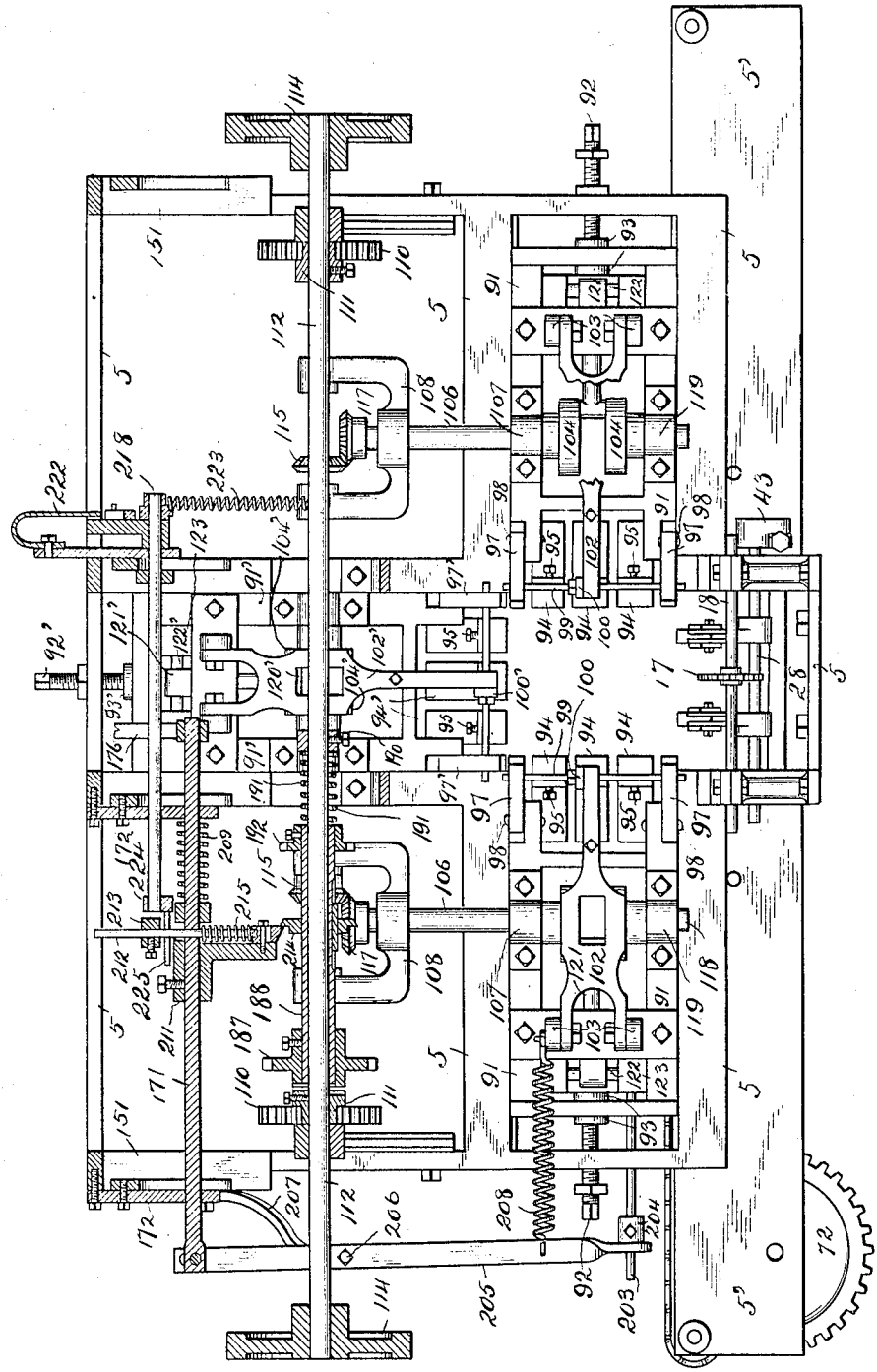

E. W. MYERS.
BOX MAKING MACHINE.
APPLICATION FILED AUG. 22, 1905.
913,837.
Patented Mar. 2, 1909.
14 SHEETS—SHEET 7.
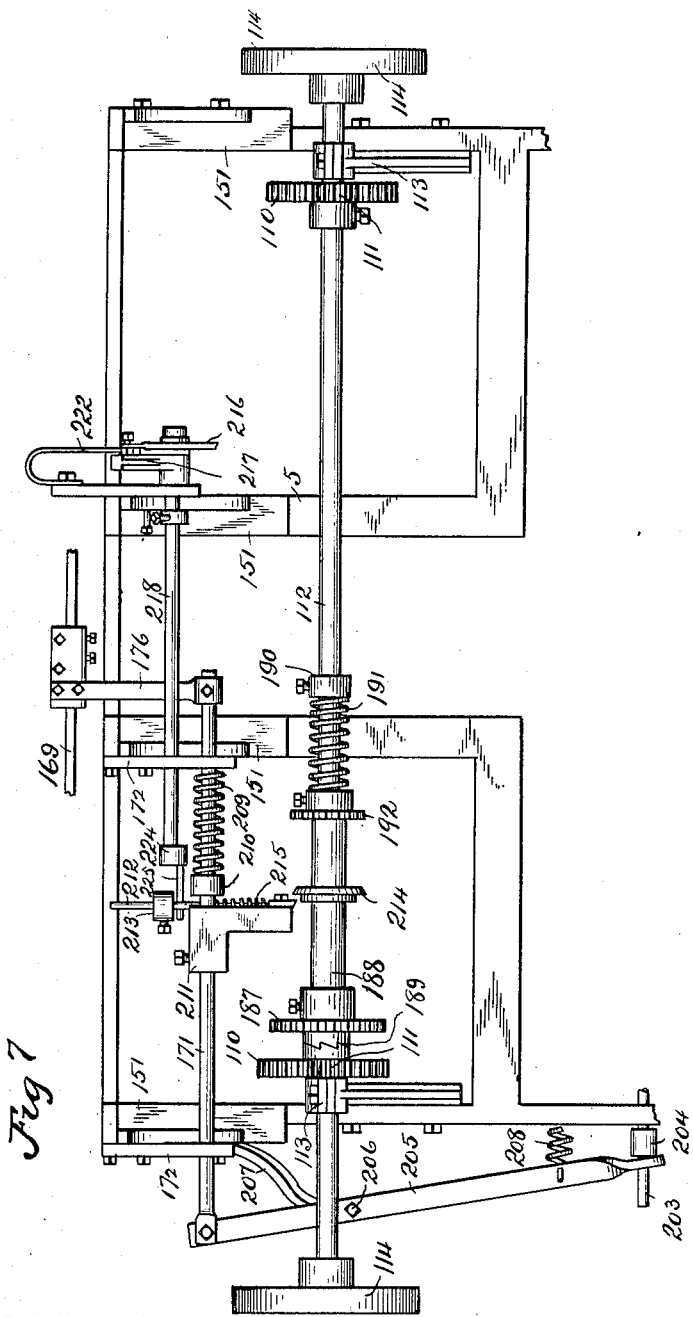
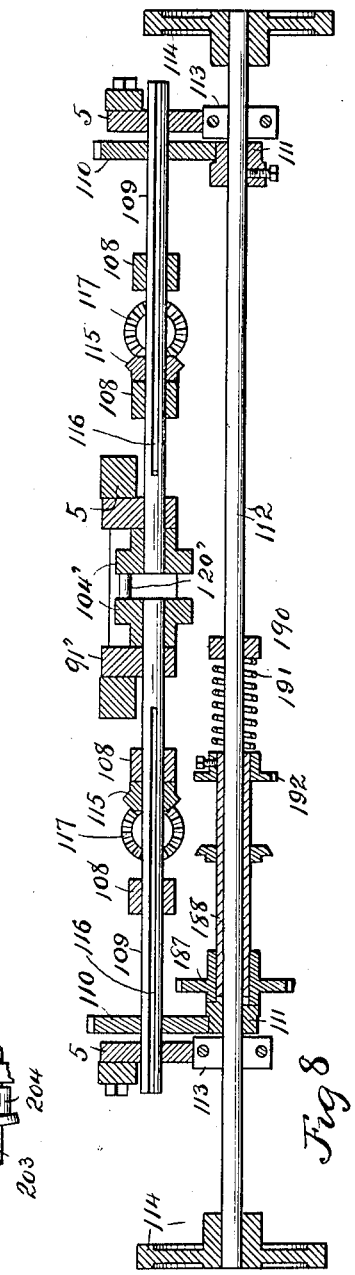
WITNESSES:
R. E. Hamilton.
J. W. Ochs
INVENTOR
E. W. Myers,
By Warren D. Hous
His Attorney.

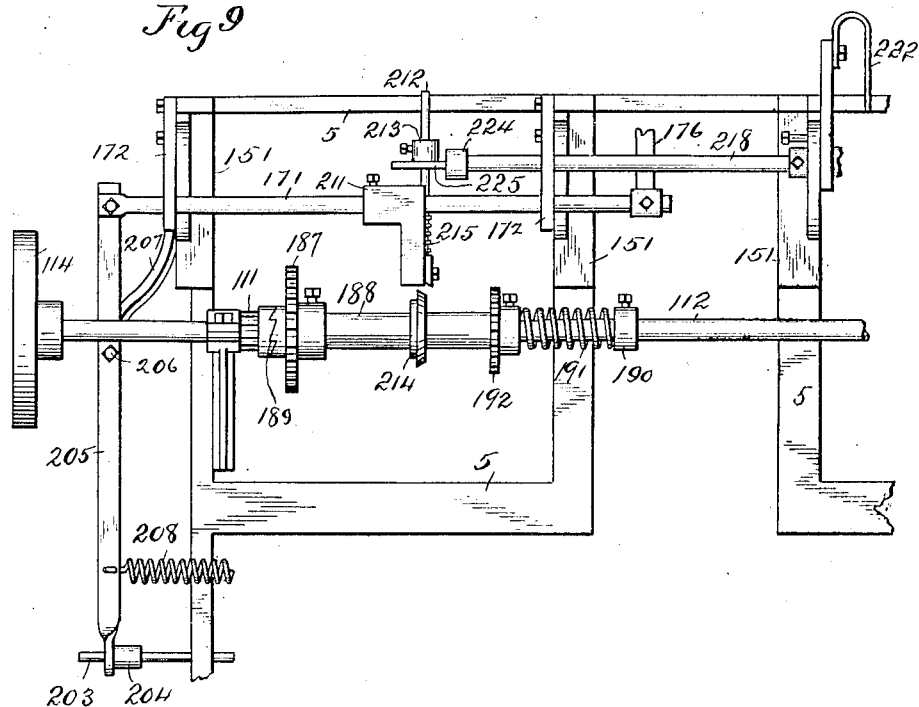
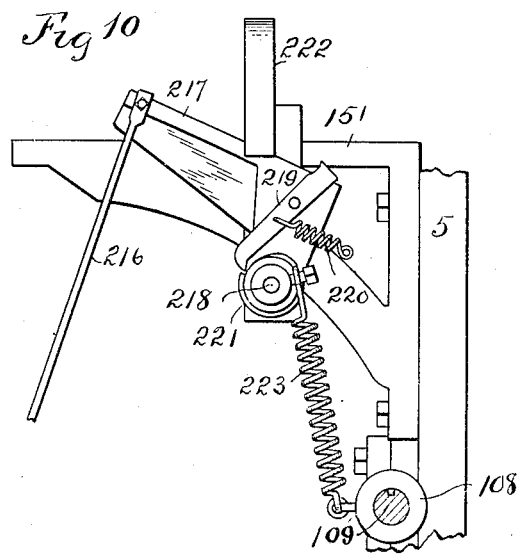
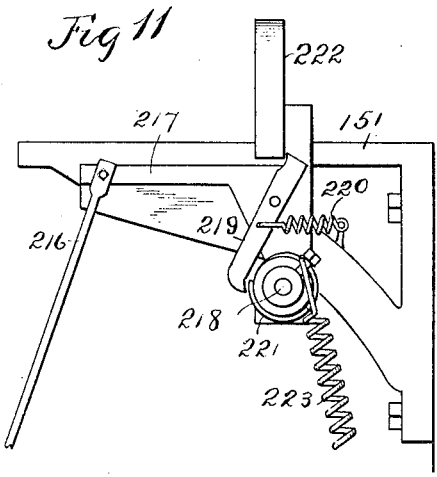

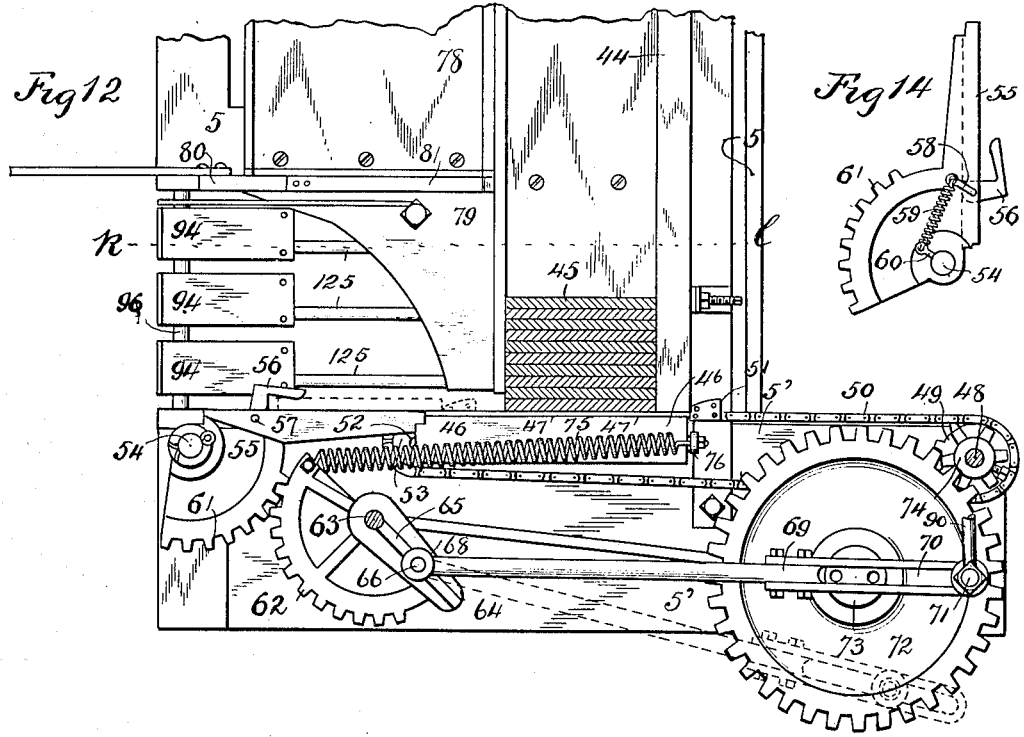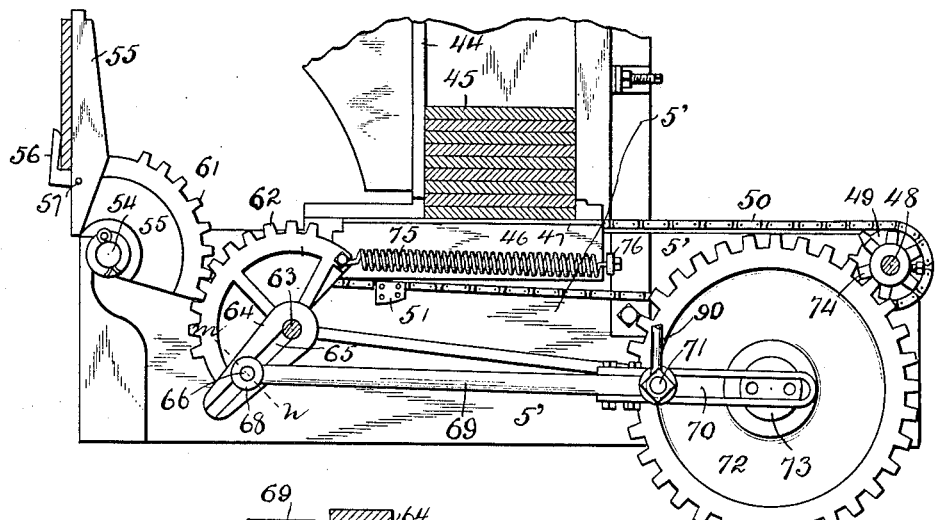

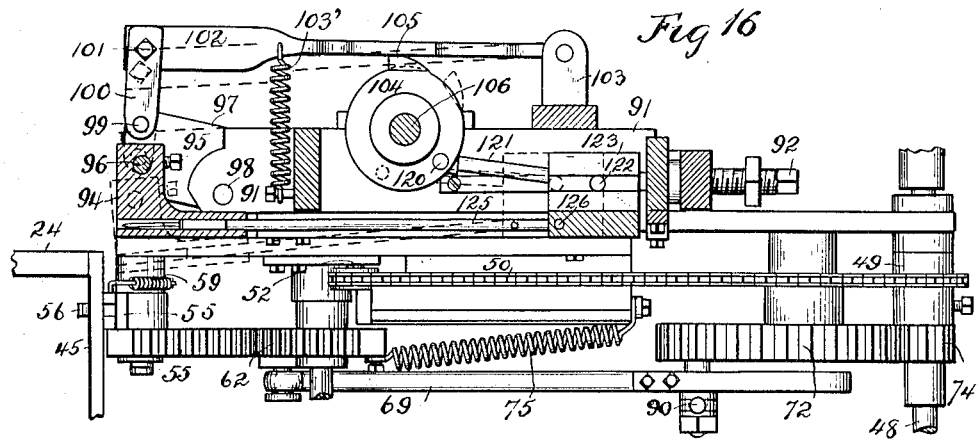
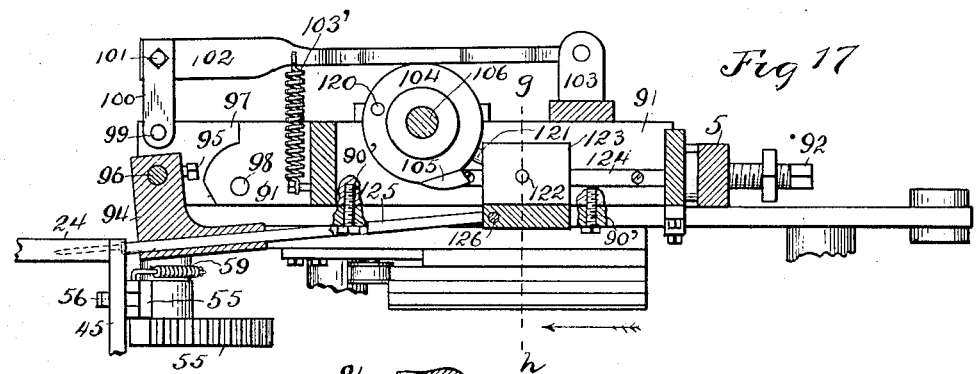
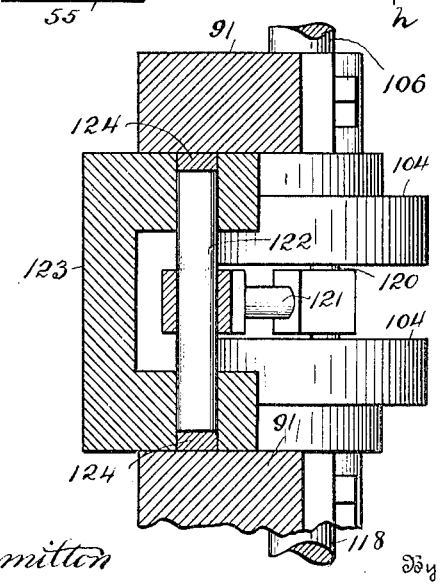

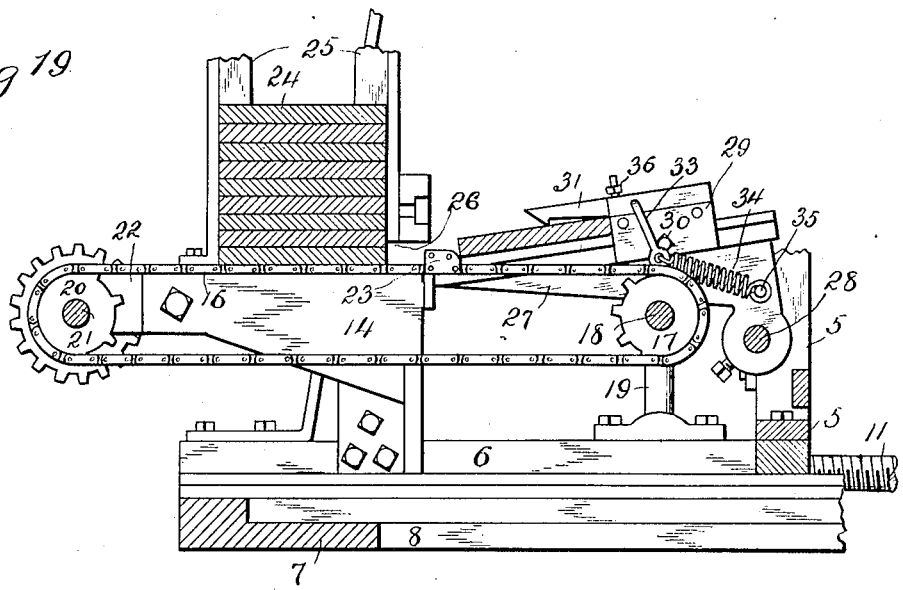
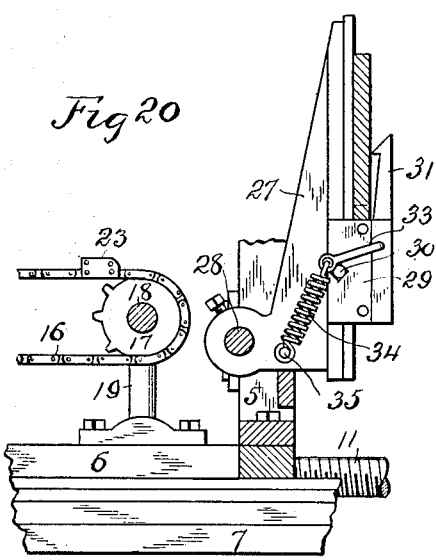
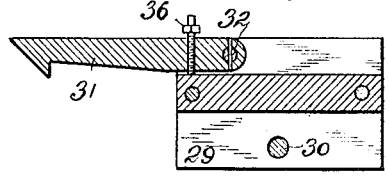
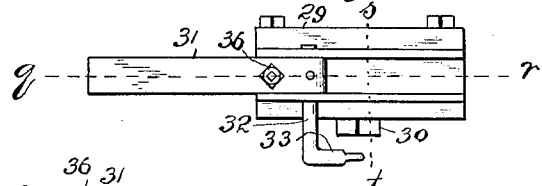
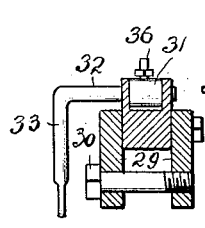

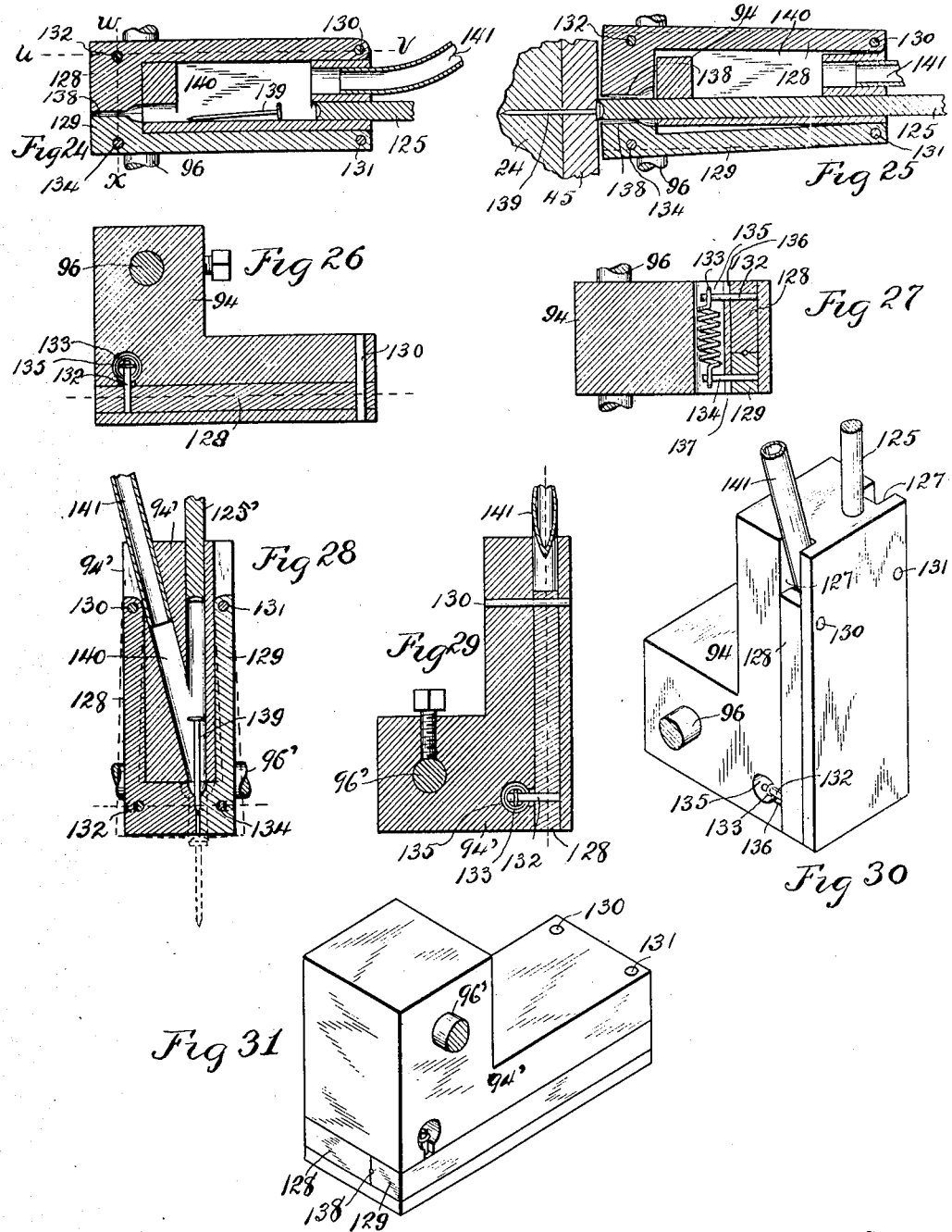

E. W. MYERS.
BOX MAKING MACHINE.
APPLICATION FILED AUG. 22, 1905.
913,837.
Patented Mar. 2, 1909.
14 SHEETS—SHEET 13.
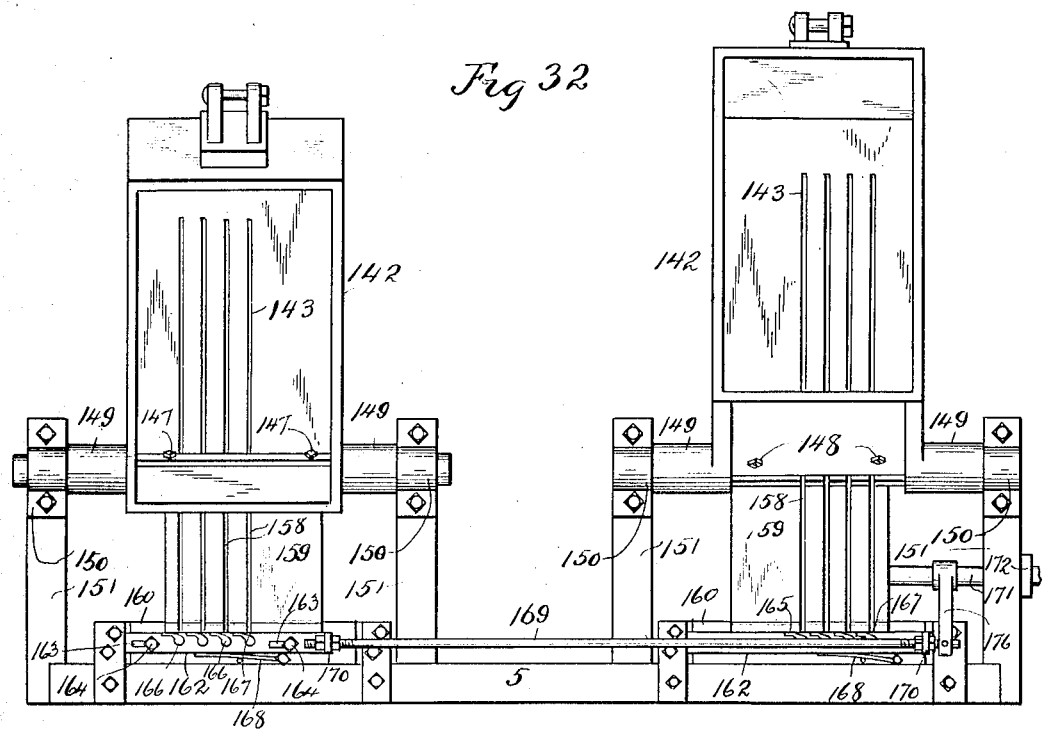
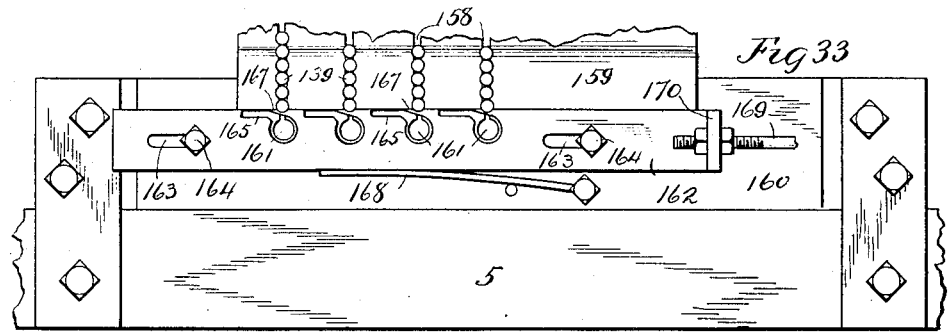
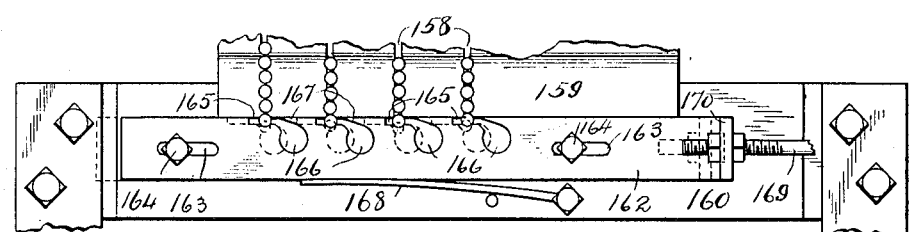
WITNESSES:
R. E. Hamilton.
J. W. Ochs.
INVENTOR
E. W. Myers
By Warren D. House
His Attorney.

E. W. MYERS.
BOX MAKING MACHINE.
APPLICATION FILED AUG. 22, 1905.
913,837.
Patented Mar. 2, 1909.
14 SHEETS—SHEET 14.
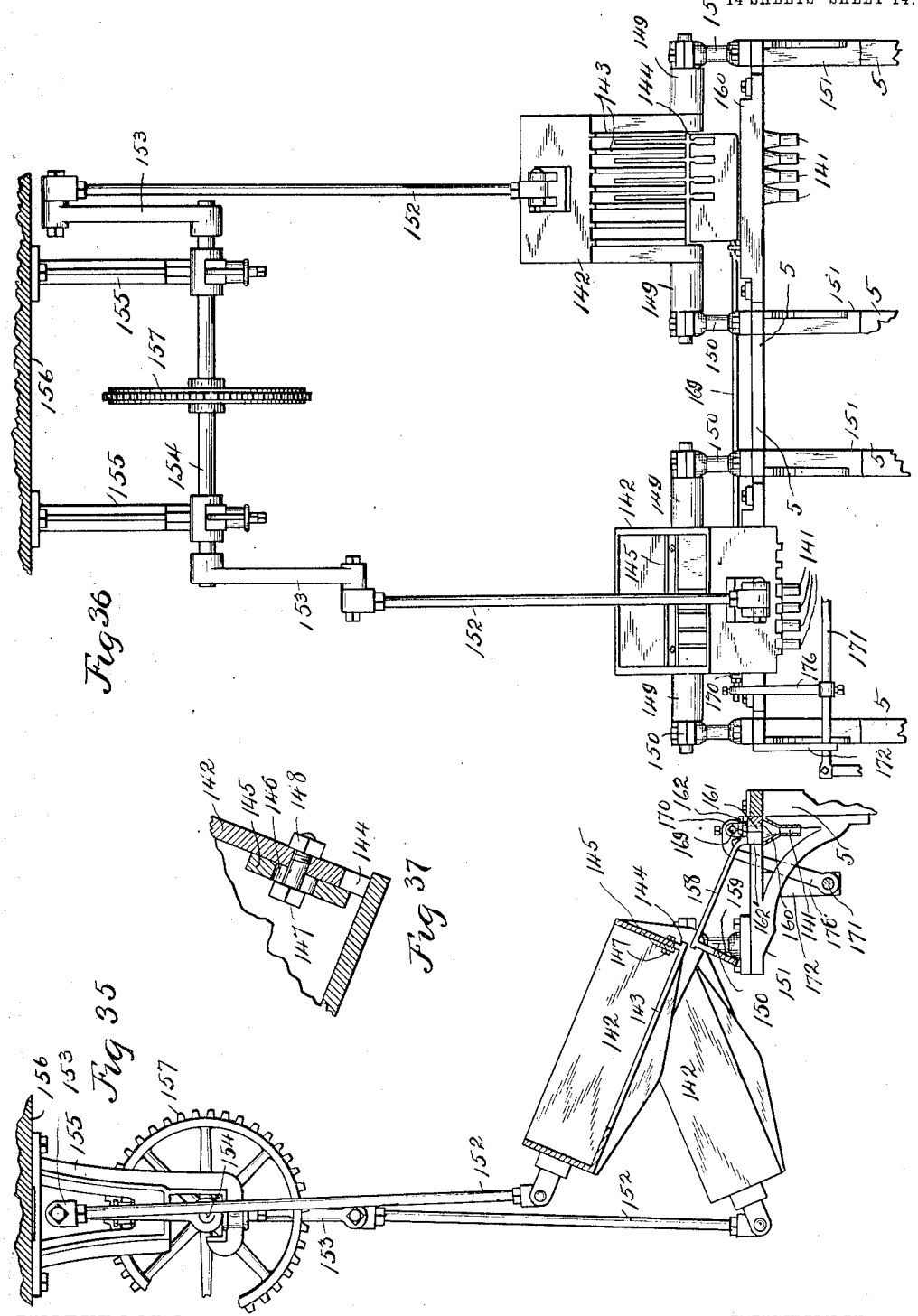
WITNESSES:
R. E. Hamilton.
J. W. Ochs
INVENTOR
E. W. Myers
By Warren D. House,
His Attorney.

UNITED STATES PATENT OFFICE.

EDGAR W. MYERS, OF ROSEDALE, KANSAS, ASSIGNOR TO AMERICAN BOX MACHINE COMPANY, OF KANSAS CITY, MISSOURI, A CORPORATION OF MISSOURI.

BOX-MAKING MACHINE.

No. 913,837.  Specification of Letters Patent.  Patented March 2, 1909.

Application filed August 22, 1905. Serial No. 275,273.

*To all whom it may concern:*

Be it known that I, EDGAR W. MYERS, a citizen of the United States, residing at Rosedale, in the county of Wyandotte and State of Kansas, have invented certain new and useful Improvements in Box-Making Machines, of which the following is a specification.

My invention relates to improvements in box nailing machines.

The object of my invention is to provide a machine for very rapidly and automatically making wooden boxes.

My invention provides a machine particularly adapted to make rectangular wooden boxes, the side, end and bottom boards of which are formed from material previously prepared in suitable dimensions.

My invention provides a machine having suitable board assembling and nailing feeding and driving mechanisms by means of which the side, end and bottom boards are simultaneously withdrawn from separate piles, then properly assembled to form a box, after which all of the nails for securing the members of the box to each other are simultaneously and automatically driven.

My invention provides further, mechanism by which the side, end and bottom boards are withdrawn from different piles of boards, one board at a time from each pile, the boards being disposed in the piles in a horizontal position, means by which the side and end boards so withdrawn are then swung to a vertical position and in position for being nailed to each other, the withdrawn bottom board being then positioned for nailing to the other board forming the box, and nail driving mechanisms for simultaneously driving all the nails for securing the assembled boards together.

My invention provides further, a machine capable of adjustment for the assembling and nailing together of boards of different length, width, and thickness for the purpose of forming boxes of different dimensions.

My invention provides further, board assembling, holding and nailing mechanisms by which the side, end and bottom boards are simultaneously assembled to form the box, then securely and releasably held in position for nailing, the box being automatically released from the holding mechanism after the nails have been simultaneously driven.

Other novel features are hereinafter fully described and claimed.

Figure 2:
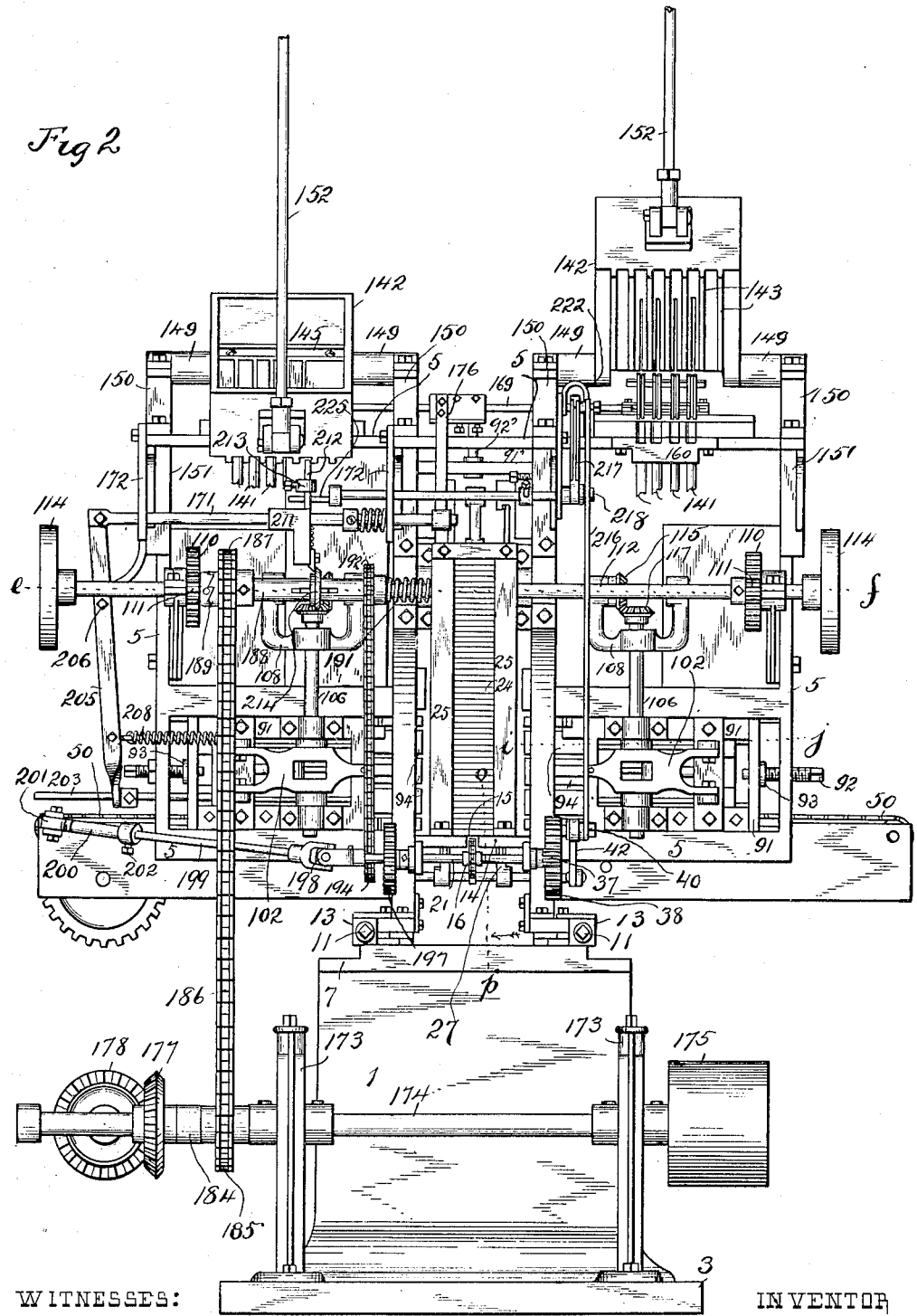
Figure 3:
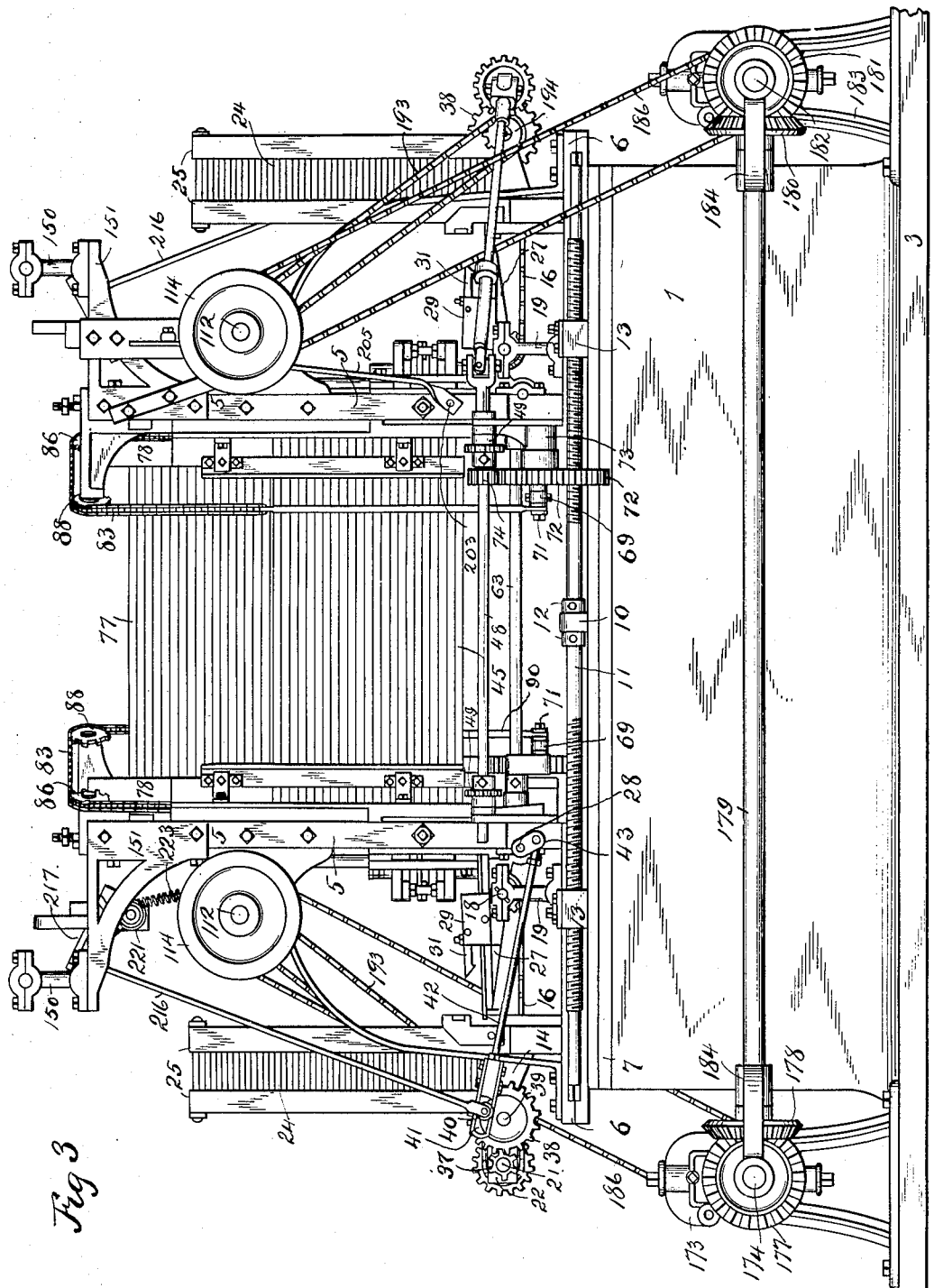
Figure 4:
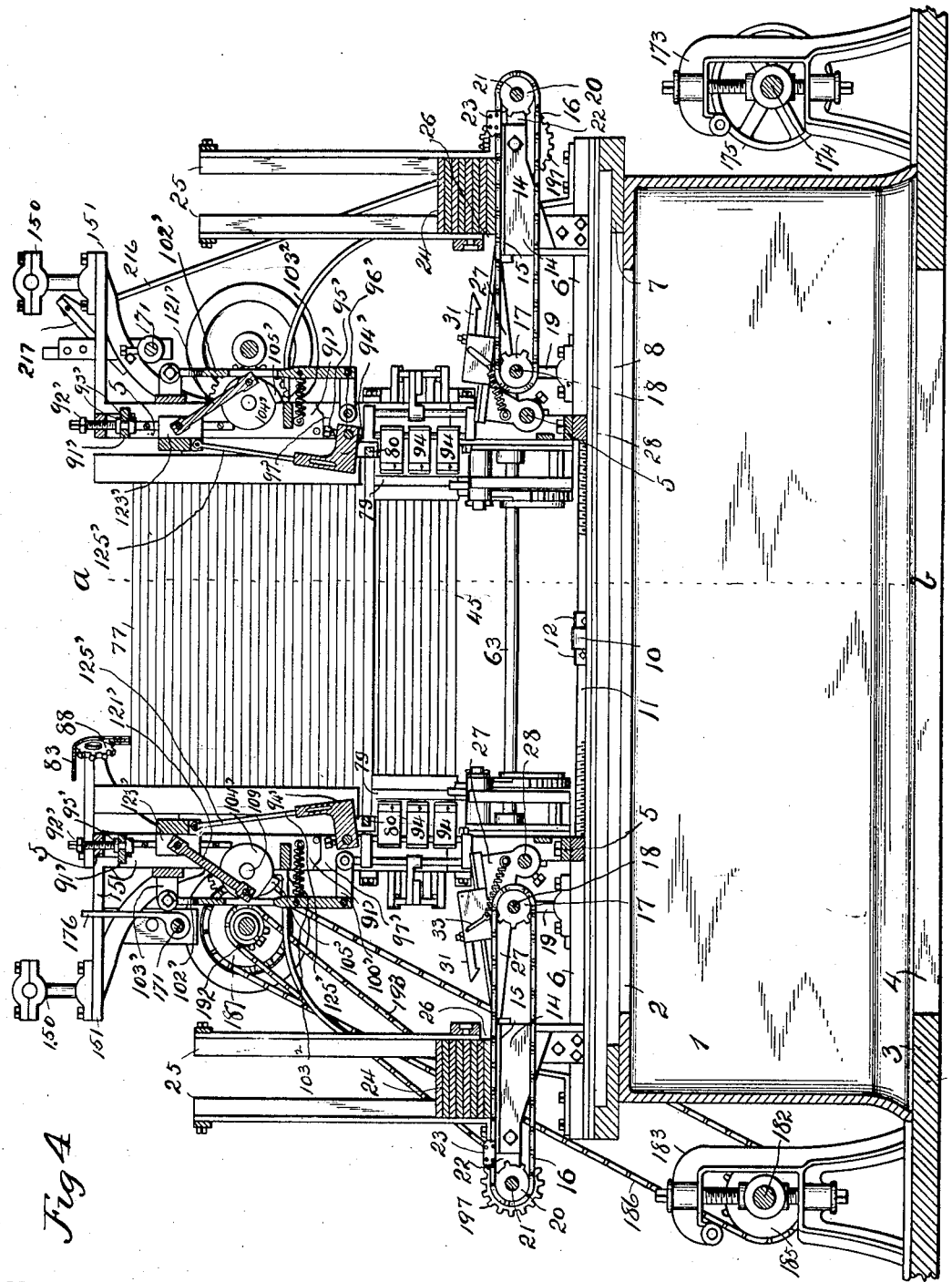
Figure 5:
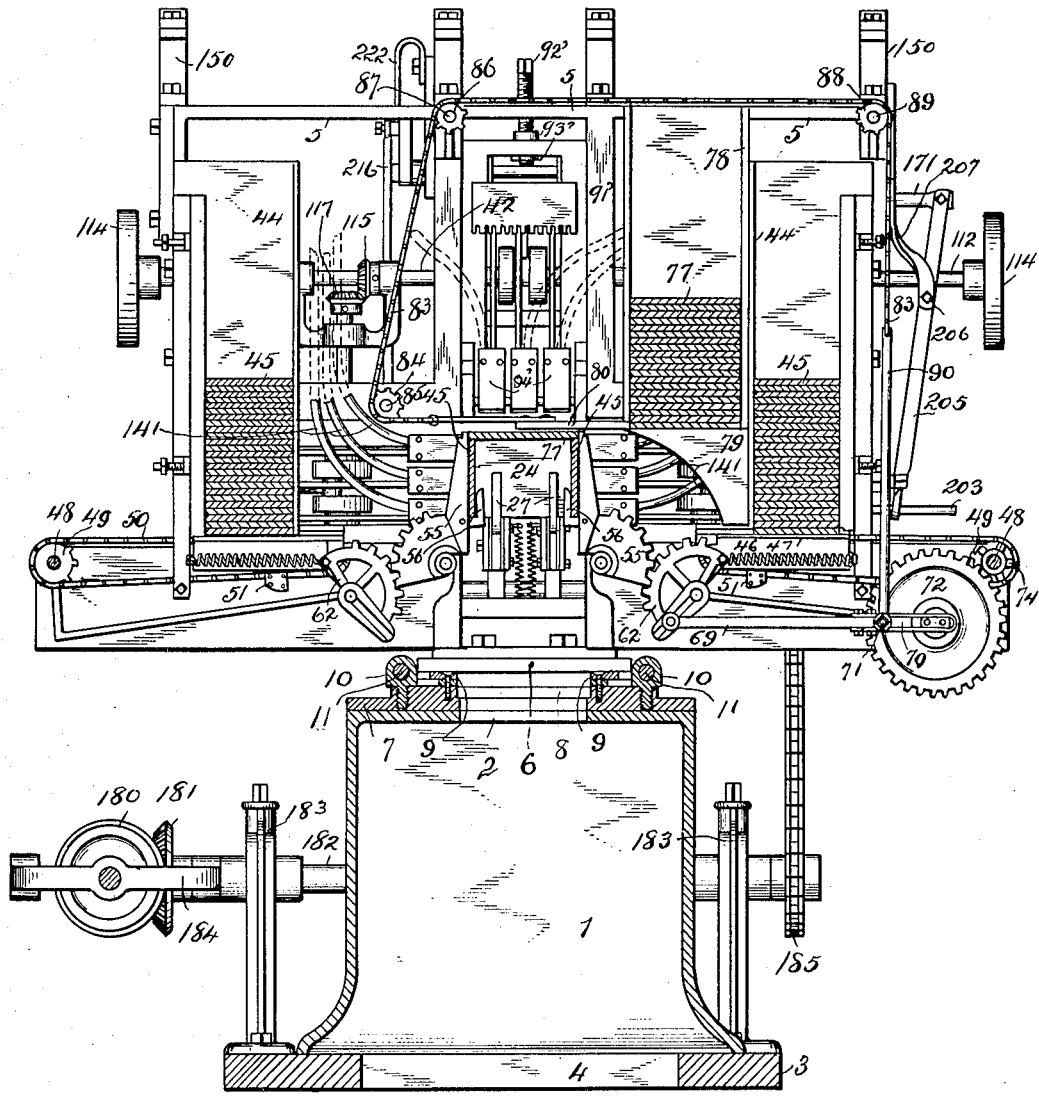

In the accompanying drawings, which illustrate my invention, Figure 1 is a plan view of the machine, part of the nail feeding mechanism being omitted. Fig. 2 is an end elevation view of the machine, part of the nail feeding mechanism being broken away. Fig. 3 is a side elevation of the machine, part of the nail feeding mechanism being omitted. Fig. 4 is a longitudinal vertical sectional view of what is shown in Fig. 3. Fig. 5 is a transverse vertical sectional view, taken on the dotted line $a$—$b$ of Fig. 4. Fig. 6 is a transverse, vertical sectional view, taken on the dotted line $c$—$d$ of Fig. 1, similar parts being broken away. Fig. 7 is an end elevation view of one of the clutches and some of the parts coöperating therewith, and a portion of the adjacent vertical supporting frame. Fig. 8 is a horizontal sectional view of the clutch mechanism and parts connected therewith, taken on the dotted line $e$—$f$ of Fig. 2. Fig. 9 is an end elevation view of some of the parts shown in Fig. 7 but occupying in some instances, different positions. Fig. 10 is a side elevation view of some of the clutch controlling parts. Fig. 11 is a view similar to Fig. 10, the movable parts being shown in different positions from that occupied by them in Fig. 10. Fig. 12 is an enlarged transverse sectional view of one of the side board assembling mechanisms, the view being taken on the dotted line $a$—$b$ of Fig. 4, the parts being shown in position for removing from the pile the bottom board. Fig. 13 is a view similar to Fig. 12, and showing the side board positioned for nailing. Fig. 14 is a side elevation view of one of the members for swinging in position the side boards. Fig. 15 is a sectional view taken on the dotted line $m$—$n$ of Fig. 13. Fig. 16 is a horizontal sectional view taken on a plane corresponding to the dotted line $i$—$j$ of Fig. 2, and the dotted line $k$—$l$ of Fig. 12, and showing the parts in the positions assumed by them just prior to the positioning of the nail boxes for driving. Fig. 17 is a view similar to Fig. 16, the parts being shown in the positions occupied by them while the nails are being driven. Fig. 18 is a vertical sectional view taken on the dotted line $g$—$h$ of Fig. 17. Fig. 19 is a vertical sectional view taken on the dotted line $o$—$p$ of Fig. 2, showing one of the end board feeding and assembling mechanisms with the parts in the positions occupied by them just prior to positioning the board ready for nailing. Fig. 20 is a vertical sectional view similar to that shown in Fig. 19, of some of the parts shown in the said figure, with the end board positioned ready for nailing. Fig. 21 is a sectional view taken on the dotted line $q$—$r$ of Fig. 22. Fig. 22 is a top view of a portion of the mechanism employed for releasably holding the boards in position for nailing. Fig. 23 is a transverse sectional view taken on the dotted line $s$—$t$ of Fig. 22. Fig. 24 is a longitudinal sectional view of one of the nail driving boxes, showing the nail driving plunger retracted. Fig. 25 is a view similar to Fig. 24, showing the plunger forcing a nail into the boards forming the box. Fig. 26 is a horizontal sectional view, taken on the dotted line $u$—$v$ of Fig. 24. Fig. 27 is a cross section taken on the dotted line $w$—$x$ of Fig. 24. Fig. 28 is a vertical sectional view of one of the nail boxes used for driving nails in the bottom board. Fig. 29 is a view similar to Fig. 28 but taken in a plane at right angles from that in which Fig. 28 is taken. Fig. 30 is a perspective view of the nail box shown in Figs. 28 and 29. Fig. 31 is a perspective view of the nail box shown in Figs. 24, 25, 26 and 27, which represent one of the boxes used for driving the nails in the side boards. Fig. 32 is a top view of the nail pans at one end of the machine and parts connected therewith. Fig. 33 is a plan view, enlarged, of a portion of one of the nail feeding mechanisms with the nail feeding slide shown in position for dropping the nails. Fig. 34 is a view similar to Fig. 33 with the nail feeding slide retracted for receiving another installment of nails. Fig. 35 is a side elevation view, also partly in vertical section, of a portion of the nail feeding mechanism at one end of the machine. Fig. 36 is an end elevation view of what is shown in Fig. 35. Fig. 37 is an enlarged vertical sectional view of the lower end of one of the nail pans.

Similar characters of reference denote similar parts.

1 denotes the base of the machine, preferably a hollow rectangular body, open at its lower end and provided with an opening 2 in its upper end for the passage therethrough of the completed boxes. The lower end of the base 1 is supported upon the floor or platform 3, provided with an opening 4 through which the finished boxes may pass. Upon the upper side of the base are two transverse vertical frames 5, each provided with an outwardly extending, longitudinally disposed horizontal portion 6. The two frames 5 are similar in construction and serve to support the boards for making the boxes, the board assembling mechanism, and the nail feeding and driving mechanisms.

Upon the upper side of the base 1 is mounted the longitudinally disposed plate 7 provided with a central opening 8 for the passage of the boxes, and provided at each side of said opening with two longitudinal parallel guide strips 9 on which are slidably mounted the horizontal portions 6 of the frames 5. Near the middle of the plate 7, at each side of the frame 6, is secured a post 10, in which is mounted rotatably, a longitudinal, horizontal bar 11. On each bar 11 at each side of the post 10, is secured a collar 12, which prevents longitudinal movement of the bar 11. Each of said bars is provided at its ends with right and left screw threads. The screw threaded ends of the two bars 11 are mounted respectively in screw threaded holes provided in the lateral lugs 13, secured one at each side of each horizontal portion 6 of the frames 5. By rotating the two bars 11 in the proper directions the frames 5 may be moved toward and from each other to positions for properly supporting the piles of boards which are to form the sides and bottom of the box. Such longitudinal adjustment of the frames 5 provides for the making of boxes of different lengths.

The mechanisms at both ends of the machine, supported by the frames 5 and their horizontal portions 6, being identical in construction, a description of the mechanism at one end will answer for the other. Near the outer end of the portion 6, is mounted a table 14 provided in its horizontal portion with a longitudinal slot 15, through which passes the upper side of a horizontal, longitudinal link belt 16, the inner end of which is mounted on a sprocket wheel 17, supported by a rotary shaft 18, the ends of which are mounted respectively in the upper ends of vertical bearings 19, and the lower ends of which are supported upon the upper side of the frame 6. The outer end of the belt 16 is mounted on a sprocket wheel 20, supported by a transverse horizontal rotary shaft 21, the ends of which are supported by the brackets 22, secured to the outer side of the table 14. These parts are best illustrated in Figs. 1, 2, 3, 4, 19 and 20. Upon one of the links of the belt 16 is mounted a button 23 which, when the belt 16 is driven, passes through the slot 15 and engages and carries along with it the under one of a series of horizontal boards 24, mounted in a vertical pile upon the upper side of the table and between four vertical guides 25, the lower ends of which are secured to the upper side of the table 14. The boards 24 are used for the end boards of the boxes. When the shaft 21 is rotated in the manner hereinafter described, the belt 16 is driven carrying with it the button 23 which, in passing through the slot 15, carries with it the under board from the pile 24 and deposits the said board upon the upper sides of two arms 27, each rigidly secured to a horizontal transverse rock shaft 28, rotatively mounted in suitable bearings provided upon the frame 5. The inner guides 25 are provided with notches 26 through which the lower board 24 may slide.

Referring particularly to Figs. 19 to 23 inclusive, it will be seen that each of the arms 27 has mounted on it a boxing 29, which is adjustable lengthwise on the arm 27 and may be secured in any desired position thereto, by means of a set screw 30 adapted to have its inner end bear against the side of the arm 27. A pawl 31, having its outer end extending beyond the boxing 29, has its inner end mounted on and rotatable with a horizontal, transverse rock shaft 32, provided at one end with a crank arm 33, to which is secured one end of a coil spring 34, the other end of which is secured to a pin 35, projecting laterally from the arm 27. An adjusting screw 36 is rotatably mounted in a threaded opening provided in the pawl 31. The inner end of said adjusting screw is adapted to rest against the transverse portion of the boxing 29. The inward movement of the pawl 31 may thus be regulated.

Referring now to Figs. 1, 2 and 3,—37 denotes a pinion mounted on and rotatable with the shaft 21 and meshing with the spur gear wheel 38 rotatively mounted on a stud 39, projecting laterally from one side of the table 14. On the outer side of the gear wheel 38 is provided a pin 40, mounted in a slot 41 provided lengthwise in the outer end of an inwardly extending connecting rod 42, the inner end of which is pivotally connected to the outer end of a crank arm 43, the inner end of which is secured to one end of the shaft 28, to which the arms 27 are secured. It will thus be seen that when the shaft 21 is driven the belt 16 will be driven and will force the boards 24, one by one, from the table 14, upon the arms 27 and under the pawls 31. The mechanism is so timed that when the withdrawn board is in the position shown in Fig. 19, the connecting rod 42, through the intermediacy of the gears 37, 38, and pin 40, crank arm 43 and rock shaft 28, will force the arms 27 to the position shown in Fig. 20, in which position the withdrawn end board will be disposed between the adjacent ends of the side boards, ready for being nailed thereto. The releasable pawls 31 on the arms 27 are pivotally mounted in the manner shown, so that after the box has been nailed together and the arms 27 swung toward the position shown in Fig. 19, the pawls 31 will yield against the pressure of the springs 34 so as to permit the pawls to pass under the lower edges of the end boards, after which the springs 34 will retract the said pawls to the normal position relative to the arms 27, shown in Figs. 19 and 20. The slot 41 is provided in the rod 42 so that the arms 27 may be at rest while the boards 24 are being moved upon the arms 27, and also at the time the arms are in the position shown in Fig. 20 during the nailing operation. The parts are so arranged that during the nailing operation, the stud 39, pin 40 and pivotal point of the rod 42 and crank 43 will be in alinement with each other, thus rigidly holding the arms 27 while the nails are being driven into the boards supported by said arms 27.

Referring to Figs. 3, 4, 5, 12, 13, 16 and 17, the following is a description of the means for assembling and supporting the boards which form the sides of the boxes. Two mechanisms are employed to support and feed the side boards, and each mechanism being similar to the other, but one need be described. In each frame 5 are mounted, one at each side of the opening 2 of the base 1, two transversely horizontally adjustable carriages 91 hereinafter described, the carriages being adjustable toward and from each other in order to accommodate the machine to making boxes of different widths. Four vertical frames 5' are rigidly secured between the frames 5 one to each carriage 91. Four vertical guides 44 are secured, as shown in Fig. 1, one to each frame 5'. The side boards 45 are piled in horizontal layers between corresponding guides 44 on opposite frames 5', and are supported by transverse plates 46 having flanges 47 upon which the boards rest and secured to the lower ends of the guides 44 respectively. Rotatively mounted at its ends in opposite frames or plates 5' is a shaft 48 having mounted thereon two sprocket wheels 49. On each wheel 49 is mounted one end of a link belt 50 disposed adjacent one of the frames 5' and having a button 51 adapted to pass under the pile of boards 45 and engage and force inwardly from under the pile the lowermost board. The other end of the belt is supported upon a sprocket wheel 53 rotatively mounted upon a stud 52 extending at right angles inwardly from the adjacent frame 5'. Upon the inner side of each frame 5', is provided a stud 54, upon which is mounted a rock arm 55, upon which the withdrawn boards from the pile 25 are deposited by means of the button 51 on the link belt 50. To hold the side boards during the process of nailing, each of the arms 55 has pivoted to one side of it a pawl 56 adapted to receive between it and the arm 55 the withdrawn board. Each pawl 56 is secured to a rock shaft 57 rotatively mounted in the arm 55 and provided with a crank arm 58, to one end of which is secured the coil spring 59, the other end of which is secured to a pin 60, mounted in the stud 54, on which the arm 55 is mounted. Each arm 55 is provided with a series of teeth 61, forming a segmental gear which meshes with a segmental gear 62, mounted upon and rotatable with a horizontal longitudinal shaft 63, the ends of which are rotatively mounted in transverse holes provided respectively in the vertical portions of the two frames 5'. One of the segmental gears 62, at each side of the machine, is provided with an arm 64, having a dovetail radial slot 65, in which is mounted the inner end of a pin 66, as shown in Fig. 15, on which pin is mounted a sleeve 67, which is held in position by means of a nut 68, mounted on the screw threaded outer end of the pin 66.

Upon each sleeve 67 at each side of the machine is pivotally mounted the inner end of a connecting rod 69, provided at its outer end with a longitudinal slot 70, in which is mounted a horizontal crank pin 71, secured to the side of a spur gear wheel 72 rotatively mounted upon an inwardly extending horizontal stud 73 secured to the inner side of the adjacent frame 5'. The gear 72 meshes with a pinion 74 mounted on and rotatable with the shaft 48. When the shaft 48 is rotated rotation is imparted to the gears 74 and 72 and thus rocking the arms 55 to and fro through the intermediacy of the connecting rods 69, segmental gears 62, and shaft 63. The slot 70 is provided in the connecting rod 69 so that the arms 55 may be held at rest in the position shown in Fig. 12, at which time the withdrawn board 45 is deposited by the buttons 51 upon the arms 55 and under the pawls 56. During the time the side boards are being nailed the pins 66 and 71 and stud 73 are in alinement with each other. To each of the gears 62, having connected to it the rod 69, is secured one end of the retracting spring 75 the other end of which is secured to a projection 76 on the inner side of the adjacent frame 5'. This spring normally retains the arms 55 in the position shown in Fig. 13.

The side boards are fed as follows:— During the time the end boards 24 are being raised in position for nailing, as shown in Fig. 20, the link belts 50, by means of the buttons 51, force the side boards inwardly and upon the arms 55. The arms 55 are then raised by the mechanism just described to the positions shown in Figs. 5 and 13, at which time the said boards and the assembled end boards 24 disposed between the side boards 45, are in position for nailing. At this time the bottom boards 77 are slid upon the upper edges of the assembled boards 24 and 45, as shown in Fig. 5, in position for nailing thereto. The bottom boards 77 are arranged in a pile between two vertical guides 78 the lower ends of which are secured respectively to two brackets 79 mounted respectively upon opposite guides 44 disposed at one side of the opening 2 of the base 1. Referring to Figs. 1 and 5, upon the inner side of each frame 5, just above the bracket 79 adjacent thereto, is slidably mounted in suitable bearings a horizontal transverse bar 80, also shown in Fig. 4, provided with a spring pawl 81, shown in Fig. 1, adapted to slide past the adjacent end edge of the bottom board 77 when the slide bar 80 is retracted in one direction, and then engage the rear edge of the said bottom board so as to draw the bottom board over the upper edges of the assembled boards 24 and 45, when the bar 80 is retracted in the other direction.

In order to move the bars 80 to positions in which they will engage the rear edge of the bottom board 77, each slide bar has secured to it one end of a coil spring 82 the other end of the spring being secured in any desired manner to the adjacent frame 5. After the pawls 81 have engaged the bottom board 77, as shown in Fig. 1, the slide bars 80 are moved inwardly so as to withdraw the bottom board as follows:—To the inner end of each slide bar 80, is secured one end of a sprocket chain 83. Said sprocket chain passes over a sprocket wheel 84, rotatively mounted on a stud 85, secured on the inner side of the adjacent frame 5, thence passes upwardly over a sprocket wheel 86, rotatively mounted on a stud 87, secured to the adjacent frame 5, thence over a sprocket wheel 88 rotatively mounted on a stud 89, secured to the adjacent frame 5, and thence to a vertical rod 90, to the upper end of which the chain 83 is secured, the lower end of said rod 90 being secured pivotally to the pin 71, as shown in Figs. 5, 12, 13, and 16. During the revolution of the gear wheel 72, the rod 90 is drawn downwardly, thus retracting the chain 83 and the slide bar 80 against the pressure of the spring 82, thus drawing the bottom board from the pile 77 and depositing it in position upon the upper edges of the boards 24 and 45, as shown in Fig. 5. The arrangement of the parts is such that the bottom boards are deposited in position immediately upon the assembling of the ends and side boards in the position for nailing.

The following is a description of the mechanism employed for driving the nails through the side into the end boards:—Each of the vertical frames 5 has slidably mounted upon it two horizontal substantially rectangular nail box carriages 91, disposed one at each side of the middle of the frame and adjustable toward and from each other to accommodate the machine to making boxes of different widths. Each carriage 91 has secured to its inner side the lower end of one of the frames 5' by means of two horizontal bolts 90', as shown in Fig. 17. Each carriage 91 is provided in its outer end with a horizontal transverse hole in which is rotatively mounted the inner end of a screw threaded bolt 92 which extends through and is fitted in a threaded hole provided in the adjacent end of the adjacent frame 5. As shown in Fig. 6, two collars 93 are secured upon each bolt 92, one at each side of the carriage 91, and serve to move the carriage transversely in the frame 5 in which it is mounted when the bolt 92 is properly turned.

Referring to Figs. 2, 4, 6, 12, 16, 17 and 18, 94 denotes 12 side nail driving boxes, in which the nails are fed and from which they are driven into the side boards as explained hereinafter. The boxes 94 are mounted in sets of three disposed one set at each side of the opening 2 on each frame 5, the boxes of each set being mounted one above the other. The nail boxes 94 of each set are rigidly secured by means of set screws 95, see Figs. 6, 16 and 17, to a vertical rod 96, pivotally mounted in two horizontal plates 97 pivotally connected respectively to the carriage 91 by the vertical pins 98. By swinging the plates 97 to the position shown in Fig. 16, the nail boxes 94 may be moved to a position permitting the assembling of the side boards ready for nailing, after which the plates 97 are swung to the position shown in Fig. 17 so that the nails may be driven into the side boards. The plates 97 are arranged in sets of two disposed one plate above the other. To swing each set of nail boxes 94 to and fro, each set of plates 97 has a vertical rod 99 extending through and secured to the upper and lower plates 97. To each rod 99 is pivotally connected one end of a link 100, the other end of which is pivotally connected by a vertical pin 101 to the inner end of a horizontal transverse bar 102 the other end of which is pivotally mounted between two horizontally extending ears 103 provided on the outer side, one above the other, of the adjacent carriage 91. A horizontal longitudinally disposed coil spring 103′, see Figs. 16 and 17, is connected at one end to the adjacent bar 102 and at its other end to the adjacent carriage 91. This spring normally holds the bar 102 against the peripheries of two horizontal disks 104 disposed one above the other in the adjacent carriage 91. Each disk 104 is provided with a peripheral projection 105 adapted when the disk is rotated to strike and force outwardly the adjacent bar 102. Each of the four upper disks 104 is rigidly secured to the lower end of an adjacent vertical shaft 106, of which there are four, the lower end of each shaft being rotatively mounted in bearings 107 mounted upon the outer side of the adjacent carriage 91. The upper ends of the four shafts 106 are rotatively mounted respectively in vertical holes provided in four U shaped yokes 108. The arms of each yoke 108 are provided with transverse horizontal holes in which is rotatively mounted a shaft 109, see Figs. 1 and 8. The four shafts 109 are mounted two on each frame 5 in alinement with each other, the inner ends of the shafts being rotatively mounted in the adjacent carriage 91′, and the outer ends in the frame 5. Each shaft 109 has secured upon it a spur gear wheel 110 which meshes with a pinion 111 rigidly secured upon an adjacent horizontal shaft 112 disposed parallel with the adjacent two shafts 109 and rotatively mounted in bearings 113, provided one at each end of each frame. 5. At each end of each shaft 112 is secured a balance wheel 114, which serve to secure the ready release of clutch mechanism described hereinafter and which imparts rotation to the shaft 112. Upon each of the shafts 109 is mounted a bevel gear wheel 115, which is rotatable with and slidable lengthwise upon the shaft 109, which shaft is provided with a longitudinal groove 116, to which the bevel gear 115 is keyed. Each bevel gear 115 meshes with another bevel gear 117 rigidly secured upon the upper end of each vertical shaft 106. Rotation is thus imparted to each vertical shaft 106 from adjacent shaft 109. Each lower disk 104 is rigidly secured to the upper end of a vertical shaft 118, rotatively mounted in bearings 119, secured one to the outer side of each carriage 91, see Figs. 6, 16, 17 and 18. A vertical transverse pin 120 is secured at its ends respectively to the upper and lower disks 104.

Pivotally connected at its inner end to the pin 120, is a horizontal, transverse rod 121, the outer end of which is pivotally connected to a vertical pin 122, having its ends secured respectively in the upper and lower sides of a plunger chuck 123, the upper and lower sides of which are grooved transversely to slidably fit two horizontal transverse slides 124 provided respectively upon the upper and lower inner sides of each carriage 91. When the cam disks 104 are rotated each of the plunger chucks 123 is reciprocated toward and from the adjacent nail boxes 94. A nail driving plunger 125 is pivotally connected at its outer end by means of a vertical pin 126 to the adjacent plunger chuck 123. Each of the nail plungers 125 is horizontally disposed and is slidably mounted at its inner end in a transverse hole provided through the adjacent nail box 94. The construction of each nail box 94 is best shown in Figs. 24, 25, 26, 27 and 30. The upper and lower sides of each nail box 94 are provided with horizontal grooves 127, in which are disposed respectively two jaws 128 and 129. The jaw 128 is pivoted to the box 94 at the rear end of said jaw by means of a horizontal pin 130. The jaw 129 is similarly pivoted to the nail box by means of a horizontal pin 131.

In a horizontal hole provided near the outer end of the jaw 128 is secured one end of a horizontal pin 132, to the other end of which is secured one end of a coil spring 133, the other end of which is secured to the outer end of a horizontal pin 134, the inner end of which is secured to the inner end of the jaw 129. The spring 133 is mounted in a vertical hole 135, extending through the box 94.

A slot 136 connects the hole 135 with the groove 127 for permitting vertical movement therein of the pin 132. A similar slot 137 connects the lower groove 127 with the hole 135 for permitting vertical movement therein of the pin 134. The inner side of each jaw 129 and 128 at its inner end is provided with a longitudinal groove 138 for the passage of the securing nail, one of which is denoted by 139. Each nail box 94 is provided with an interior chamber 140 into which the nails are fed, one at a time, and through which the plunger 125 passes when driving a nail.

A series of upwardly extending nail carrying tubes 141 are secured respectively, one to each nail box 94 and discharge respectively into the chambers 140, as shown in Figs. 5, 24, 25 and 30. The nail tubes 141 extend upwardly and are secured respectively to the upper ends of the frames 5, where they receive the nails from the nail feeding mechanisms, described hereinafter. When the arms 55 and 27 are swinging the side and end boards respectively into position for nailing, the cam disks 104 have rotated to positions in which the chucks 123 are retracted to the position shown in Fig. 16. At the same time the cams 105 have forced the arms 102 outwardly against the pressures of the springs 103' thus withdrawing, in the manner already described, the nail boxes 94 from the path of the side boards. At this time a nail has been fed through each tube 141 into each chamber 140, being carried there by gravity, and deposited in position directly in front of the adjacent plunger 125. Further rotation of the cam disks 104 advances inwardly each chuck 123, and thus forcing inwardly the plungers 125. At the same time the cams 105 will pass from contact with the arms 102, at which time the retracting springs 103' will force the nail boxes 94, through the intermediacy of the mechanism already described, to the position shown in Fig. 17. The continued forward movement of each plunger 125 will force the nail 139 through the grooves 138, into and through the side board 45 and into the adjacent end board 24. Each spring 133 will hold the inner ends of the adjacent jaws 128 and 129, against each other, thus supporting the nail until it has entered the boards 45 and 24. The head of the nail, together with the inner end of the plunger 125 forcing said nail, will force the inner ends of the jaws 128 and 129 apart against the pressure of the spring 133, thus permitting the plunger to pass through said jaws so as to sink the nail head into the side board, through which it is driven. Continued rotation of the shafts 106 and cam disks 104, will again cause the cams 105 to force outwardly the bars 102, thus withdrawing the nail boxes 94, through the intermediacy of the pins 101, links 100, rods 99, plates 97 and rods 96, thus releasing the nailed box and permitting it to drop downward as soon as the arms 55 have been rocked sufficiently far to release the pawls 56 from the side boards 45. At the same time the plungers 125 will be again withdrawn, after which another nail will be fed through each tube 141, into the chamber 140, into which said tube discharges at its lower end.

I will now describe the mechanism for nailing the bottom boards to the upper edges of the end boards. In the middle of each vertical frame 5 and between vertical parallel planes located at the inner ends respectively of the nail box carriages 91, is vertically and adjustably mounted a nail box carriage 91', constructed similarly to the carriages 91, disposed vertically and in a position at right angles to the carriages 91. In a vertical screw threaded hole provided in the middle and upper end of each frame 5, is rotatively mounted a vertical screw 92', the lower end of which is extended through a vertical hole provided in the upper end of the adjacent carriage 91', as shown in Figs. 2, 5 and 6. Secured upon the bolt or screw 92' at each side of the upper end of the carriage 91' are two collars 93' which securely holds the carriage in the position to which it may be adjusted. Secured one each to the inner end of each adjacent shaft 109 are two cam disks 104', corresponding in construction to the cam disks 104, and connected to each other by means of a transverse horizontal pin 120', corresponding to pin 120. Pivotally connected at its lower end to pin 120' is a connecting rod 121' the upper end of which is pivotally connected to a horizontal pin 122' mounted in a nail chuck 123' corresponding in construction to the chuck 123, and vertically slidable upon the carriage 91' upon which it is mounted. The parts just described are best shown in Fig. 4.

Pivotally connected at their upper ends to each nail chuck 123' are a series of vertical plungers 125' the lower ends of which enter openings provided in the nail boxes 94' respectively. The said plungers 125' and the boxes 94' are constructed identically in the same manner as the plungers 125 and nail boxes 94. The nail boxes 94', mounted on each frame 5, are secured rigidly by means of set screws 95', upon a transverse horizontal rod 96' pivotally mounted at its ends in two vertical plates 97', which are pivoted at their upper ends to the lower end of the carriage 91' in the same manner as are pivoted the plates 97 to the carriages 91. The plates 97' are swung inwardly and outwardly, thus swinging inwardly and outwardly the nail boxes 94', by means of links 100', pivotally connected at one end to the plates 97' and at the other end each to an adjacent vertical bar 102' which bears upon the cam disks 104' and is pivotally connected at its upper end to two ears 103' provided on the carriage 91'. The nail boxes 94' are constructed exactly similar to the boxes 94, with the exception that they are disposed in a vertical instead of a horizontal position. Each nail box 94' is provided with the jaws 128 and 129 mounted and normally held in the closed position in the same manner as the jaws 128 and 129 of the boxes 94. When the shafts 109 and disks 104' are rotated, the chucks 123' are reciprocated vertically thus reciprocating the plungers 125' and swinging inwardly and outwardly the nail boxes 94'. The parts are operated in a manner such that when the bottom boards 77 are being drawn upon the upper edges of the side and end boards by the spring pawls 81 the nail boxes 94' will be retracted. After the bottom board has been deposited in position ready for nailing the cam disks 104' will have moved so that the retracting spring $103^2$, corresponding to the springs 103', will have forced the arms 102' so as to swing the nail boxes 94 in the positions shown in Fig. 4 above the positioned bottom board and in position for nailing. Continued rotation of the cam disks 104' will then force the plungers 125' downwardly through the nail boxes 94' and forcing the nails which have been deposited therein from the nail boxes 94' through the bottom board and into the upper edges of the end boards. After the nailing operation through the continued rotation of the shafts 109, the nail boxes 94 and 94' will be retracted and the nailed box having been completed and released, will drop through the openings 2, 4 and 8, after which another set of side, end and bottom boards will be assembled and nailed in the manner hereinbefore described.

I will now describe the nail feeding mechanism:—Referring to Figs. 32 to 37, above the frames 5 are mounted four oscillating nail pans 142, disposed side by side, two above each one of the frames 5. Each of the nail pans 142 is rectangular in form and is provided in its bottom with a series of longitudinal slots 143, which extend forward through the inner end of the nail pan and connect with a transverse horizontal slot 144 provided in the forward end of the pan, as shown in Figs. 35, 36 and 37. The slots 143 admit the shanks of the nails but do not permit the passage therethrough of the heads of the nails. Upon the inner side of the inner end of each pan 142, is mounted a vertically adjustable, transverse, horizontal bar 145, which is adjustable so as to cover more or less of the slot 144. Each bar 145 is provided near each end with a vertical slot 146, in which is mounted a transverse bolt 147, the head of which bears upon the inner side of the bar 145, and the threaded outer end of which extends through the inner end of the pan 142 and has mounted upon it a nut 148, which bears against the outer side of the inner end of the pan 142. The function of the bar 145 is to prevent the passage thereunder of more than one nail at a time through each of the slots 143. The slot and bolt connection of the member 145 with the body 142 permits the adjustment upwardly and downwardly of said member for use with nails having heads of different thicknesses. The inner end of each pan 142 is provided with laterally extending trunnions 149, pivotally mounted in vertical bearings 150, disposed in two rows of four each upon the upper sides respectively of eight brackets 151, mounted four upon the outer side of the upper end of each vertical frame 5. For the purpose of rocking the pans 142 upon their respective trunnions so as to jolt the nails which are in the pan into the slots 143, the outer end of each pan 142 is pivotally secured to the lower end of an upwardly extending rod 152. There are four rods 152 disposed in pairs, the upper ends of each pair being pivotally connected respectively to two crank arms 153, secured in diametrically opposite positions respectively, to the outer ends of a transverse horizontal shaft 154, rotatively mounted in two vertical bearings 155, the upper ends of which are secured to the ceiling or any other suitable support 156. The two rock shafts 154 are disposed parallel with each other and have rotation imparted to them in any desirable manner.

In the drawings, I have shown, mounted on one of the shafts 154 and rotated therewith, a sprocket wheel 157, to which rotation may be imparted in any desirable manner, thus rotating the shaft 154 and oscillating the nail pans 142, by means of the crank arms 153 and connecting rods 152. When the nail pans are downwardly and inwardly inclined, the nails pass from said pans through the slots 143 and 144 and fall into slots 158, disposed in alinement with the slots 143 and provided in the inclined plates 159, of which there are four, mounted respectively upon the upper sides of four horizontal, transverse plates 160, secured two each to the upper end of each vertical frame 5. Each plate 160, is provided with a series of vertical holes 161, connected each with a transverse slot 162', extending outwardly to the edge of the plate 160 and in alinement with the adjacent slot 158 in the inwardly inclined plate 159. Upon the upper sides respectively, of the plates 160, are four horizontal plates 162, disposed edgewise, one against the forward edge of each inclined plate 159 and provided each with two longitudinal slots 163, in which are located respectively vertical bolts 164, the heads of which bear upon the upper sides of the plates 162, and the threaded lower ends of which are secured two to each plate 160. The outer edge of each plate 162 is provided with a series of recesses 165, which communicate with vertical holes 166, provided in the plate 162 and adapted to register with the holes 161 in the plate 160 when the slide plate 162 is in the position shown in Fig. 33. The outer edge of each plate 162 is provided adjacent each hole 166 and at one end of the adjacent recess 165, with a wedge-like projection 167, adapted to cover and uncover alternately, when the plate 162 is reciprocated, the forward end of the adjacent slot 158. A flat spring 168, secured at its upper end to the upper side of each plate 160, bears against the inner edge of the adjacent slide plate 162 and retains the outer edge of said plate against the inner edge of the adjacent plate 159. To the under sides of the plates 160, are secured respectively the nail conducting tubes 141, which lead respectively, one to each of the nail boxes 94 and 94'. The upper end of each one of the tubes 141 is located below one of the holes 161, in the plate 160 so that a nail passing through one of the holes 161 will enter the tube 141 directly beneath.

Reciprocation is imparted to the plates 162 as follows:—Two horizontal bars 169, are mounted one above each vertical frame 5. The ends of each bar 169 are rigidly secured respectively to vertical projections 170, provided one at each end of each slide bar 162. Reciprocation is imparted to each bar 169 by means of an upwardly extending rod 176 rigidly secured at its upper end to the bar 169 and rigidly secured at its lower end to a horizontal, transverse bar, 171 slidably mounted in transverse holes provided in the lower end of two vertical plates 172, the upper ends of which are secured to the upper ends respectively of two adjacent brackets 151. It will be understood that there are two slide bars 171, mounted respectively upon each of the frames 5. In Figs. 2, 6, 7 and 9, I have shown rod 176 secured to the inner end of the slide bar 171 and to the middle of the rod 169, but, as shown in Figs. 32 and 36, the rod 176 may be secured to the slide bar 171 and the rod 169 near their respective outer ends. The means for reciprocating the bar 171 will be described hereinafter.

The nail feeding operation is as follows:— As the bar 171 is moved outwardly the slide bar 169 will be also moved outwardly thus moving the slide plates 162 to the right, as shown in Figs. 32, 33 and 34 and withdrawing the wedge like projections 167 from in front respectively of the rows of nails which have been fed from the pans 142, through the slots 143 and into the slots 158, of the inclined plate 159. As the projections 167 are withdrawn the forward nails in each slot 158 will drop into the recesses 165, as shown in Fig. 34. The slide plates 162 then being reciprocated in the opposite direction by means of reverse movement imparted to the rod 169 and the slide bar 171 connected to it, will cause the wedge-like projections 167 to enter behind the nails located in the recesses 165 and force them into the round openings 161 through which the nails will pass into the conducting tubes 141 and thence into the nail boxes 94 and 94'. The movement of the bar 171 is timed so that at each time that the plungers 125 and 125' have been retracted to the positions shown in Figs. 24 and 28, the slide plates 162 will be moved to the position shown in Fig. 33, thus permitting an instalment of nails to pass one into each tube 141 and thence into the chamber 140 of the nail box to which such tube is connected. When the plungers 125 and 125' have been moved inwardly so as to drive the nails in the boards forming the box the slide bar 171 will be moved so as to force the slide plates 162 to the position shown in Fig. 34, thus permitting another instalment of nails to pass into the recesses 165, after which the operation above described will be repeated upon the successive reciprocation of the bars 171.

I will now describe the mechanism for driving the board assembling, nail driving and nail feeding mechanisms hereinbefore described, referring to Figs. 1, 2, 3, 4 and 5. At one end of the machine upon two vertical bearings 173, is rotatively mounted a transverse horizontal shaft 174, to one end of which is secured a driving pulley 175 which may be driven by any suitable driving belt. Upon the other end of the shaft 174 is secured a bevel gear 177 which meshes with the bevel gear 178 secured upon one end of the longitudinal, horizontal shaft 179, the other end of which has secured to it a bevel gear 180 which meshes with another bevel gear 181, mounted on and rotatable with a transverse horizontal shaft 182, rotatively mounted in vertical bearings 183, disposed at the end of the machine opposite the end where are located the bearings 173. The shaft 179 is rotatively supported at its ends by means of two horizontal U-shaped yokes 184, the arms of which are provided with transverse holes in which the shafts 174 and 182 are respectively rotatively mounted. Upon each shaft 174 and 182 is rigidly secured a sprocket wheel 185, each of which is connected by means of a sprocket chain 186 with a sprocket wheel 187, rigidly secured upon a sleeve 188 rotatively mounted one upon each of the shafts 112. The outer end of each sprocket wheel 187 is provided with a series of ratchet teeth 189 which are adapted to mesh with corresponding teeth provided upon the inner end of the adjacent one of one of the pinions 111. Upon each shaft 112 is secured a collar 190 against which bears the inner end of a coil spring 191 the outer end of which bears against the inner end of the adjacent sleeve 188 which spring forces the sleeve 188 and sprocket wheel 187 so that the ratchet teeth 189 of the sprocket wheel will engage the ratchet teeth of the pinion 111, thus causing rotation of the said pinion and the gear 110 and shaft 109 attached thereto. Rotation is imparted from the sleeve 188 upon each end of the machine to the end board assembling mechanism at that end of the machine, as follows:—Upon the sleeve 188 is rigidly secured a sprocket wheel 192 which is connected by means of a sprocket chain 193 with a sprocket wheel 194 rotatively mounted on stud 195 secured to the inner side of the table 14. Secured to each sprocket wheel 194 is a spur gear wheel 196 which meshes with a spur gear wheel 197 secured to and rotatable with the shaft 21 at the adjacent end of the machine.

The mechanism for feeding the side and bottom boards is operated as follows:—To the end of each shaft 21, adjacent to the gear 197 is secured, by means of a universal joint 198, the inner end of one end of a connecting rod 199, the other end of which is slidably mounted in one end of a sleeve 200 the other end of which is connected by means of a universal joint 201, with one end of one of the horizontal shafts 48. A set screw 202 in the sleeve 200, is employed to rigidly hold the rod 199 in the position to which it may be adjusted in the sleeve 200.

Referring to Figs. 1, 2, 3 and 6, the following mechanism is employed to properly time the relative movements between the different mechanisms:—Two horizontal rods 203 are secured respectively at their inner ends to the slidable chucks 123, as shown in Fig. 6. Upon each of said rods 203 is secured a collar 204, upon the outer side of which is adapted to bear the lower end of an upwardly extending lever 205 pivotally mounted by means of a transverse pin 206, to an arm 207, secured to the frame 5. When the two nail chucks 123, to which the rods 203 are secured, move outwardly, thus retracting the plungers 125, the collars 204 will force outwardly the lower ends of the two levers 205, thus forcing inwardly the upper ends of said levers which upper ends are pivoted respectively to the outer ends of the slidable bars 171. Two horizontal retracting springs 208 are secured respectively at their outer ends to the lower ends of the levers 205, the inner ends of said springs being secured respectively to one of the ears 103 upon the adjacent nail box carriage 91. The springs 208 serve to retract the lower ends of the levers 205 inwardly when the rods 203 are inwardly moved. A coil spring 209 encircling the bar 171 and having one end bearing upon one of the plates 172 and the other end against a collar 201, rigidly secured upon the bar 171, assists the spring 208 in retracting the lever 205 and bar 171. These springs may be dispensed with providing the springs 208 are sufficiently powerful and, in fact, is omitted in Fig. 9.

The mechanism for withdrawing the sleeves 188 so as to retract the sprocket wheels 187 from toothed engagement with the pinions 111 consists of the following parts:— Upon each one of the bars 171 is rigidly secured a block 211 having on its inner side a vertical groove in which is slidably mounted a vertical rod 212, to the upper end of which is rigidly secured a collar 213 and the lower end of which is provided with a beveled head adapted to engage with the outer side of a disk 214 provided with a beveled periphery and secured rigidly upon the adjacent sleeve 188. A coil spring 215 encircles each rod 212 and has its lower end bearing upon the head of said rod and its upper end bearing upon the under side of the bar 171, through which the rod 212 extends. When the sleeve 188 is in the position shown in Fig. 6 and the bar 171 is in the position shown in the said figure, the rod 212 will engage the outer side of the disk 214 and hold the teeth 189 from engagement with the teeth of the adjacent pinion 111. When the arms 27 have positioned the end boards ready for nailing the mechanism for nailing the end and side boards should be permitted to act. This is accomplished by raising the rods 212, thus freeing the disks 214 from said rods and permitting the springs 191 to force the rotating sleeves 188 outwardly on the shafts 112 until the toothed sprocket wheels 187 engage the toothed pinions 111, thus rotating, as hereinbefore described, the shafts 109, thus actuating the nail driving mechanisms.

To raise the rods 212 at the proper time, the following mechanism is provided, referring particularly to Figs. 2, 6, 7, 3, 9, 10 and 11:—To the outer ends respectively of the pins 40, on the spur gear wheels 38, are pivotally mounted respectively the lower ends of two upwardly extending rods 216, the upper ends of which are pivoted respectively to two arms 217, pivotally mounted respectively upon two horizontal transverse rotary shafts 218, mounted respectively in the two inner brackets 151 of each vertical frame 5. Upon each of the arms 217 is pivotally mounted a pawl 219, normally held by means of a spring 220 in engagement with a toothed disk 221, rigidly secured one upon each of the shafts 218. Each of the said springs 220 is secured to the adjacent bracket 151. Upon one of the brackets 151 of each of the frames 5, is secured an inverted U-shaped bracket 222, against which the upper end of the adjacent pawl is adapted to strike when the arm carrying the said pawl has arrived at the proper position, as shown in Fig. 11. Retraction of the shafts 218 in a direction opposite that in which they are rocked by the pawls 219, is obtained by means of two coil springs 223, each of which is secured at its upper end to the adjacent collar 221, and the lower ends of which are secured respectively to the adjacent arms of the yokes 108. Upon the opposite end of each rock shaft 218 is rigidly secured a collar 224 to which is rigidly secured an eccentrically mounted pin 225 adapted to strike the underside of the adjacent collar 213 and raise the rod 212, to which said collar 213 is secured. When the spur gears 38 have reached a position diametrically opposite that shown in Fig. 3, the rods 216 will have rocked the arms 217, pawls 219, collars 221 and shafts 218, to the positions shown in Figs. 11 and 9, at which time the pin 225 will have raised the rods 212 in the position shown in Fig. 9, in which the said rods will clear the disks 214, in which position the springs 191 will force the sleeves 188 into toothed engagement with the pinions 111, thus actuating the nail driving mechanism.

After the nails have been driven and the chucks 123 and 123' and the plungers 125 and 125' retracted away from the completed box, the box will drop from the machine, as hereinbefore explained, at the same time the levers 205 will be forced outwardly at their lower ends by the collars 204 on the rods 203, thus forcing inwardly the rods 171 and blocks 211 and causing the lower ends of the rods 212, which in the meanwhile have been lowered by means of the rotation of the rods 218 and the pressure of the springs 215, to engage the outer sides of the disks 214 respectively. The inward movements of the blocks 211 and 212, through the intermediacy of the disks 214, will force the sleeves 188 and toothed sprocket wheels 187 out of engagement with the toothed pinions 111, which toothed pinions, being mounted upon the shafts 112 respectively, will cease to impart rotation to said shafts and the nail driving mechanisms, actuated by said shaft, as hereinbefore described, will remain inactive until a new set of end, side and bottom boards shall have been re-assembled in position to form another box by the mechanism hereinbefore described. When the arms 27, 55 and sliding bars 80 having the pawls 81 mounted thereon, have moved to positions in which they will have carried the end, side and bottom boards into the positions required for forming another box, the rods 216 will again have been moved in positions such that the arms 217 and pawls 219 will have rocked the collars 221 and shafts 218 to positions such that the pins 225 on the collars 224 will have again elevated the rods 212 from engagement with the disks 214, thus permitting the springs 191 to again move outwardly the sleeves 188 to positions such that the toothed sprocket wheels 187 will re-engage the toothed pinions 111 thereby imparting rotative movement to said pinions and actuating the nail driving mechanism in a manner such that the nail boxes 94 and 94' will be moved inwardly to the positions shown in Figs. 4 and 17 and the nail chucks 123 and 123' will have forced the plungers 125 and 125' respectively forward so as to have driven the nails, which have been deposited in the meantime in the nail boxes, into the lumber forming the box, at that time in position for nailing.

Before the machine is put into operation the bars 11 are turned in a direction such that the vertical frames 5, with their horizontal portions 6, will have been moved longitudinally to positions in which the lumber for forming the side and bottom boards 45 and 77 respectively, will pass between the frames 5 and will rest upon their supports 47 and 79 respectively. The boards 24, 45 and 77, previously prepared in suitable lengths, widths and thicknesses for the end, side and bottom boards respectively, are then placed in their respective holding mechanisms, previously described. The nail boxes 94 are then adjusted lengthwise upon their supporting bars 96 to the positions thereon suitable for the positions desired for the nails which are to secure the side boards to the end boards, after which the set screws 95, shown in Fig. 6, may be tightened so as to securely hold the boxes in position on the bar 96. The set screws 95 in the boxes 94' are similarly tightened against the horizontal supporting rod 96' after the nail boxes 94' have been adjusted horizontally to the proper positions. Rotation then being imparted to the shaft 174, the mechanism already described will be actuated thereby and cause the boards to be rapidly and automatically assembled and nailed together in the form of boxes. Thereafter it will be but necessary to supply the pans 142 with a quantity of nails and to continue the supply of end, side and bottom boards and place them in their proper positions on the machine. The machine thus, with the aid of a single operator, will automatically rapidly form and nail daily a very large number of boxes.

Having thus described my invention, what I claim and desire to secure by Letters Patent, is:—

1. The combination with means for vertically positioning the side and end boards with the side boards against and at right angles to the end boards, of means for positioning and supporting during the nailing operation the bottom board upon the upper edges of the assembled side and end boards, and means for simultaneously nailing the assembled boards together.

2. In a box making machine, the combination with holders for containing respectively the boards for forming the sides, ends and bottoms of the boxes, of means for withdrawing from said holders consecutively, a series of sets of boards, each set comprising a board from each holder, means for assembling and supporting during the nailing operation each withdrawn set of boards to form a box with the end and side boards disposed vertically, and the bottom board supported upon the upper edges of the side and end boards, and means for simultaneously nailing together each set of boards so positioned.

3. In a box making machine, the combination with holders for containing respectively the boards for forming the sides, ends and bottoms of the boxes, of means for withdrawing from said holders consecutively and carrying the same in a horizontal position to the place where the boards are assembled to form the boxes, a series of sets of boards, each set comprising a board from each holder, means for swinging the side and end boards from a horizontal to a vertical position below the bottom board, the upper edges of the side and end boards supporting the bottom board, and means for simultaneously nailing the assembled boards to each other while they are in the position last named.

4. In a box making machine, the combination with means for receiving and supporting during the nailing operation a set of boards forming the ends and sides of a box, of means for depositing upon said supporting means respectively the boards forming the sides and ends of a box, means for moving said supporting means so as to vertically position the side and end boards at right angles to each other, means for positioning the bottom board upon the upper edges respectively of the assembled side and end boards, and means for simultaneously nailing together the assembled side, end and bottom boards.

5. In a box making machine, the combination with a suitable support, of devices hinged thereto for supporting during the nailing operation the boards for forming the sides and ends of a box, means for swinging said devices to and from positions in which the side and end boards will be disposed vertically at right angles to each other, means for carrying the bottom board and depositing it upon the upper edges of the assembled side and end boards, and means for simultaneously nailing together the boards assembled to form the box.

6. In a box making machine, the combination with holders for containing respectively the boards for forming the sides, ends and bottoms of the boxes, of board supporting devices for receiving and supporting during the nailing operation, a set of side and end boards, of a support on which said devices are pivotally mounted, and upon which they may be swung to and from positions in which the side and end boards of the set are disposed vertically at right angles to and against each other, means for withdrawing from the holders containing the side and end boards, one board from each holder, and depositing them upon said devices respectively, means for swinging said devices to and from said positions, means for withdrawing from the holder containing the bottom boards, a bottom board and depositing it upon the upper edges of the withdrawn side and end boards after said board supporting devices have been swung to positions in which the boards carried thereby are positioned vertically to form a box, and means for simultaneously nailing together the assembled set of boards.

7. In a box making machine, the combination with holders for containing respectively the boards for forming the sides, ends and bottom of the boxes, of a plurality of belts provided with means for respectively removing consecutively from said holders, containing the side and end boards, sets of boards, one from each holder, and delivering said sets to the place where the box is formed, swinging means for consecutively positioning and supporting during the nailing operation, the withdrawn sets of side and end boards so that the side boards are disposed vertically against and at right angles to the end boards, means for consecutively withdrawing single boards from the holder containing the bottom boards and positioning the bottom boards as withdrawn upon the upper edges of the assembled sides and ends, and means for simultaneously nailing together the assembled sets of boards.

8. In a box making machine, the combination with holders for containing respectively the side, end, and bottom boards disposed in horizontal layers, one above the other, a plurality of devices for supporting during the nailing operation the side and end boards withdrawn from the holders for forming a box, said devices being respectively adjustable toward and from each other, means for simultaneously sliding from their respective holders, a set of side and end boards, one board from each holder, and depositing them upon their respective supporting devices, means for simultaneously swinging said devices to and from positions in which the withdrawn side and end boards will be disposed against and at right angles to each other, means for withdrawing from the holder containing the bottom boards, a bottom board and depositing it upon the upper edges of the withdrawn side and end boards when assembled in position to form a box, and means for simultaneously nailing together the set of assembled boards.

9. The combination with swinging means for positioning and supporting during the nailing operation the side and end boards vertically against and at right angles to each other, of means for positioning upon the upper edges of the assembled side and end boards the bottom board, nailing means movable in and out of the path respectively of oppositely disposed boards and provided with means for holding together the side and end boards during the nailing operation, means for nailing the bottom board to the assembled sides and ends, and means for simultaneously operating both of said nailing means.

10. The combination with swinging means for positioning and supporting during the nailing operation the side and end boards vertically against and at right angles to each other, of means for positioning the bottom board upon the upper edges of the assembled side and end boards, nail driving means movable to and from positions for holding together the assembled sides and ends, nail driving means for nailing the bottom board upon the assembled sides and ends, means for simultaneously operating both of said nail driving means, holders for containing respectively the side, end and bottom boards, and means for consecutively removing from said holders sets of boards, one board at a time from each holder and delivering said sets of removed boards consecutively to both said board positioning means, respectively.

11. The combination with separate swinging means for respectively positioning and supporting during the nailing operation the side and end boards with the side boards disposed vertically against and at right angles to the end boards, the end board positioning means being relatively adjustable toward and from each other, of means for positioning the bottom board upon the upper edges of the sides and ends, and means for simultaneously nailing the bottom, side and end boards together in the assembled positions.

12. The combination with separate means for respectively positioning the side and end boards with the side boards disposed vertically against and at right angles to the end boards, the side board positioning means being adjustable relatively toward and from each other, and the end board positioning means being adjustable relatively toward and from each other, of means for positioning the bottom board upon the upper edges of the assembled side and end boards, and means for simultaneously nailing together the assembled side, end and bottom boards.

13. The combination with holders for containing respectively the side, end and bottom boards, of devices for respectively positioning and supporting during the nailing operation the side and end boards withdrawn from the holders with the side boards disposed vertically against and at right angles to the end boards, means for withdrawing a board at a time from the holder containing the bottom boards and positioning the bottom board upon the upper edges of the assembled side and end boards, a plurality of belts provided with means for withdrawing from their respective holders consecutive sets of side and end boards and delivering the withdrawn sets, one set at a time, to their respective positioning means, and means for simultaneously nailing together the assembled side, end and bottom boards.

14. The combination with holders for containing respectively the side, end and bottom boards, of swinging devices for positioning and supporting during the nailing operation the side and end boards withdrawn respectively from their holders with the side boards disposed vertically against and at right angles to the end boards, means for swinging said devices from receiving positions to positions for assembling said withdrawn side and end boards, means for consecutively withdrawing from their respective holders sets of side and end boards and delivering them to their respective swinging devices, means for withdrawing from their holder, one at a time, and delivering upon the upper edges of the assembled side and end boards, the bottom boards, and means for simultaneously nailing together the assembled boards.

15. The combination with holders for containing respectively the side, end and bottom boards, of swinging devices for positioning and supporting during the nailing operation the side and end boards respectively withdrawn from their holders with the side boards disposed vertically against and at right angles to the end boards, means for withdrawing one board at a time from the holder containing the bottom boards and depositing it against the upper edges of the assembled side and end boards, a plurality of belts provided with means for respectively withdrawing from their respective holders sets of side and end boards and depositing them upon their respective swinging devices, means for driving said belts, and means for simultaneously nailing together the assembled boards.

In testimony whereof I affix my signature in presence of two witnesses.

EDGAR W. MYERS.

Witnesses:
WARREN D. HOUSE,
R. E. HAMILTON.